United States Patent [19]

Murphy et al.

[11] 4,412,280

[45] Oct. 25, 1983

[54] COMPLEMENTARY COMMANDS IN FAIL-OPERATIONAL, FAIL-SAFE MULTI-COMPUTER CONTROL SYSTEM

[75] Inventors: Richard D. Murphy, Monroe; Douglas H. Clelford, Shelton, both of Conn.

[73] Assignee: United Technologies Corporation, Hartford, Conn.

[21] Appl. No.: 151,488

[22] Filed: May 19, 1980

Related U.S. Application Data

[62] Division of Ser. No. 938,583, Aug. 31, 1978, Pat. No. 4,270,168.

[51] Int. Cl.³ .................. G06F 15/46; G06F 11/08; G06F 15/16
[52] U.S. Cl. .................. 364/200; 371/24; 371/71
[58] Field of Search .............. 371/16, 24, 34, 71; 364/200 MS File, 900 MS File

[56] References Cited

U.S. PATENT DOCUMENTS

| | | | |
|---|---|---|---|
| 3,444,528 | 5/1969 | Lovell et al. | 364/200 |
| 3,829,668 | 8/1974 | Noumi et al. | 371/68 |
| 3,889,109 | 6/1975 | Blessin | 371/24 |
| 3,921,141 | 11/1975 | Wilber et al. | 364/200 |
| 4,032,757 | 6/1977 | Eccles | 371/9 |
| 4,070,648 | 1/1978 | Mergenthaler et al. | 371/24 X |

*Primary Examiner*—Eddie P. Chan
*Attorney, Agent, or Firm*—M. P. Williams

[57] ABSTRACT

For each of two computer systems, logic flowcharts describe background program in which highly detailed memory checksum tests of fixed memory and complementary tests of variable memory are performed, the background program being interrupted for utility programs which are for the most part responsive to transducer or other sensor and discrete inputs to calculate control values for operation of control actuators or other responsive devices. The utility programs include specific self test routines. A direct memory access unit is included in each computer for moving data between inputs of either computer and memories of both, and between the memories of both computers. Periodic testing of fault codes registering the health of each computer is done during utility program routines, any variation from normal causing further health-analysis routines to be performed until dispositive action-causing conditions are determined. Neither computer checks the internal health of other, but inputs, results and data link transmissions must compare equally between the two computers, or routines determine whether one computer will recognize itself (or a component thereof) as being faulty, and disable itself. If not, then each computer disables itself after disabling the other. A variety of self tests and other checks and routines are included. Disablement is accomplished in a complex fashion of each computer's output, by itself, and additional disablement if instituted by the other computer.

3 Claims, 21 Drawing Figures

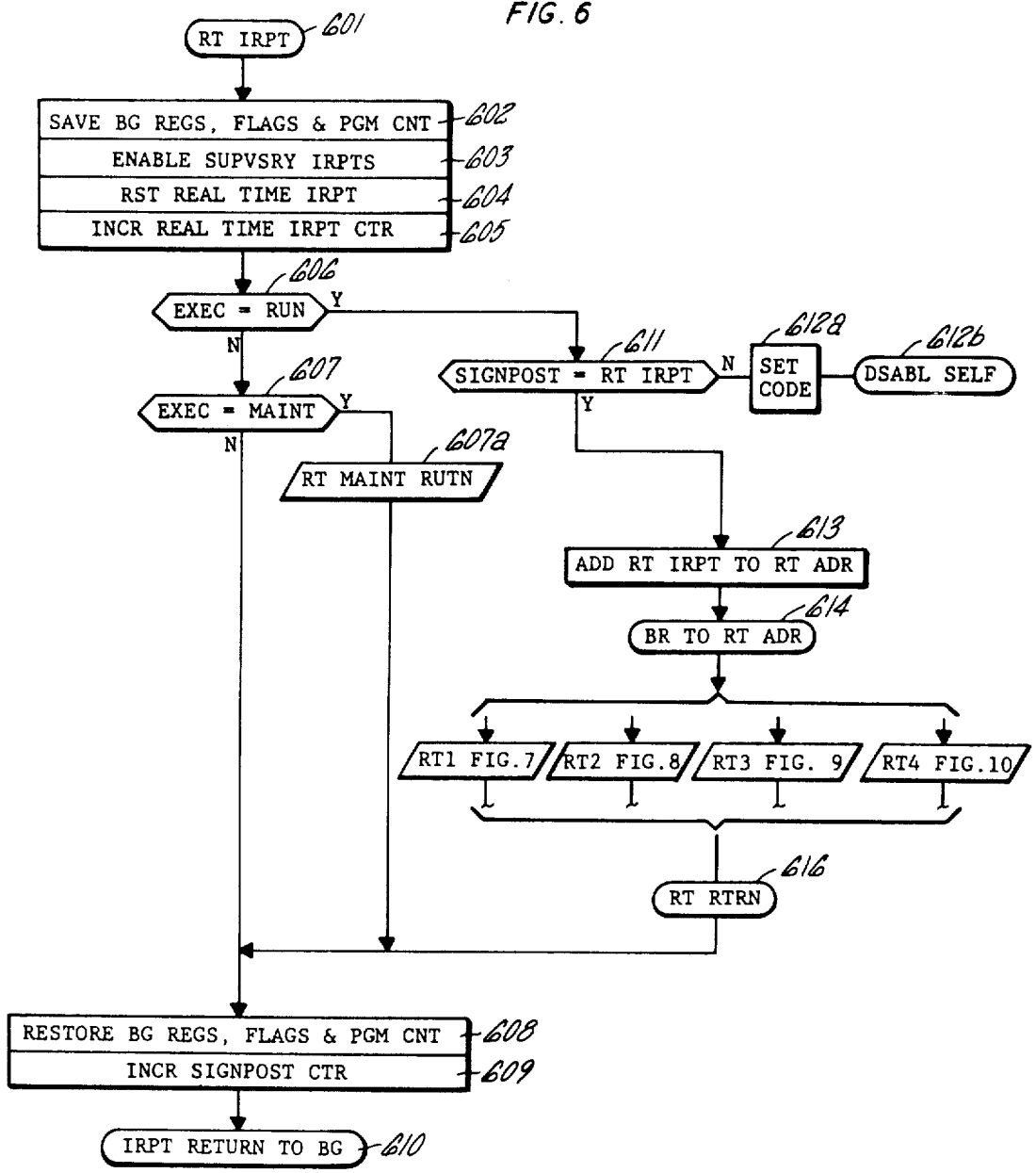

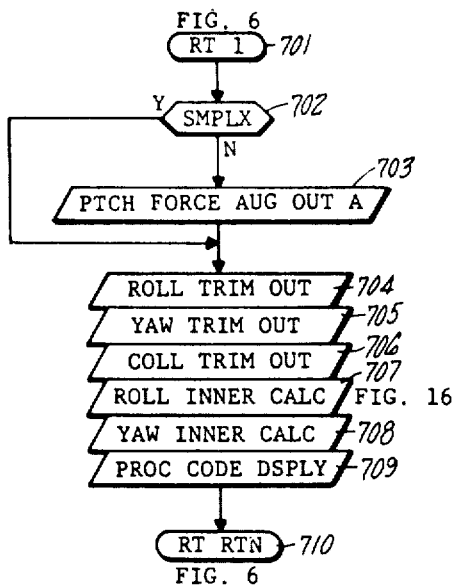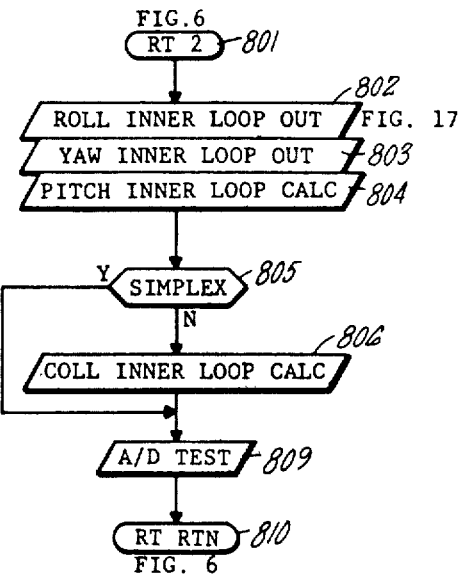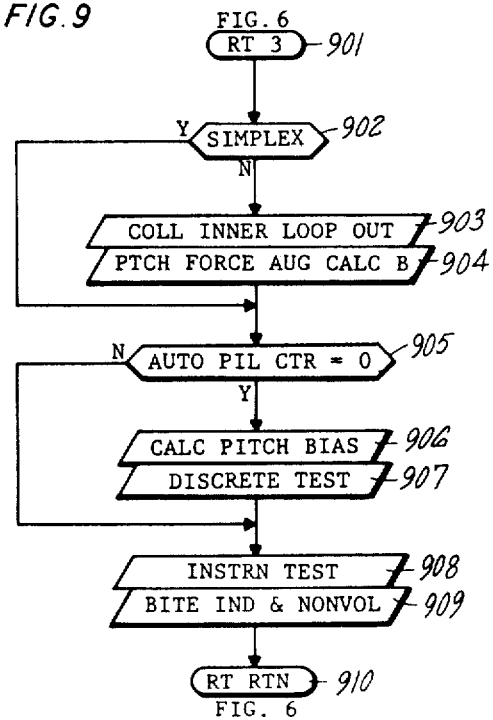

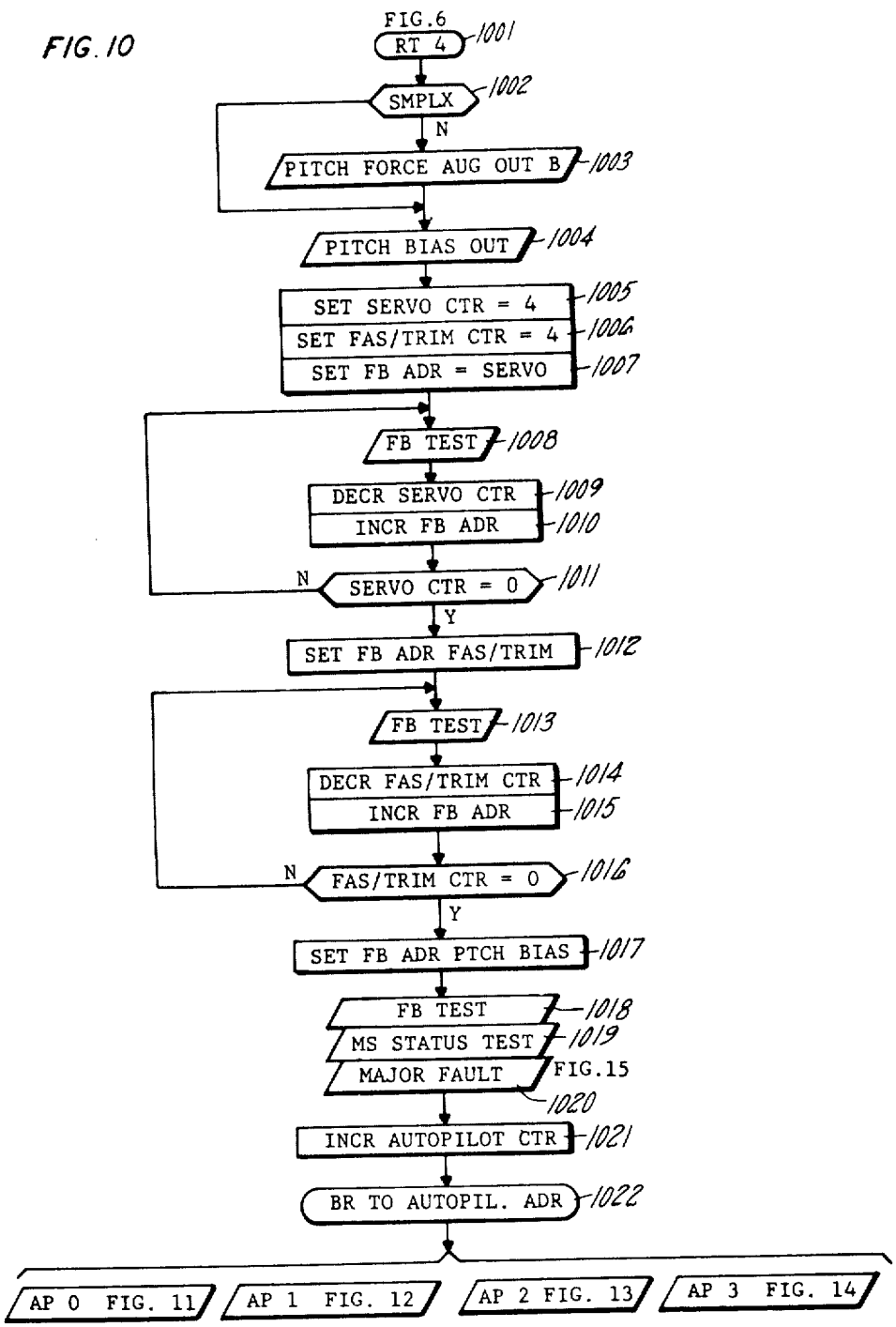

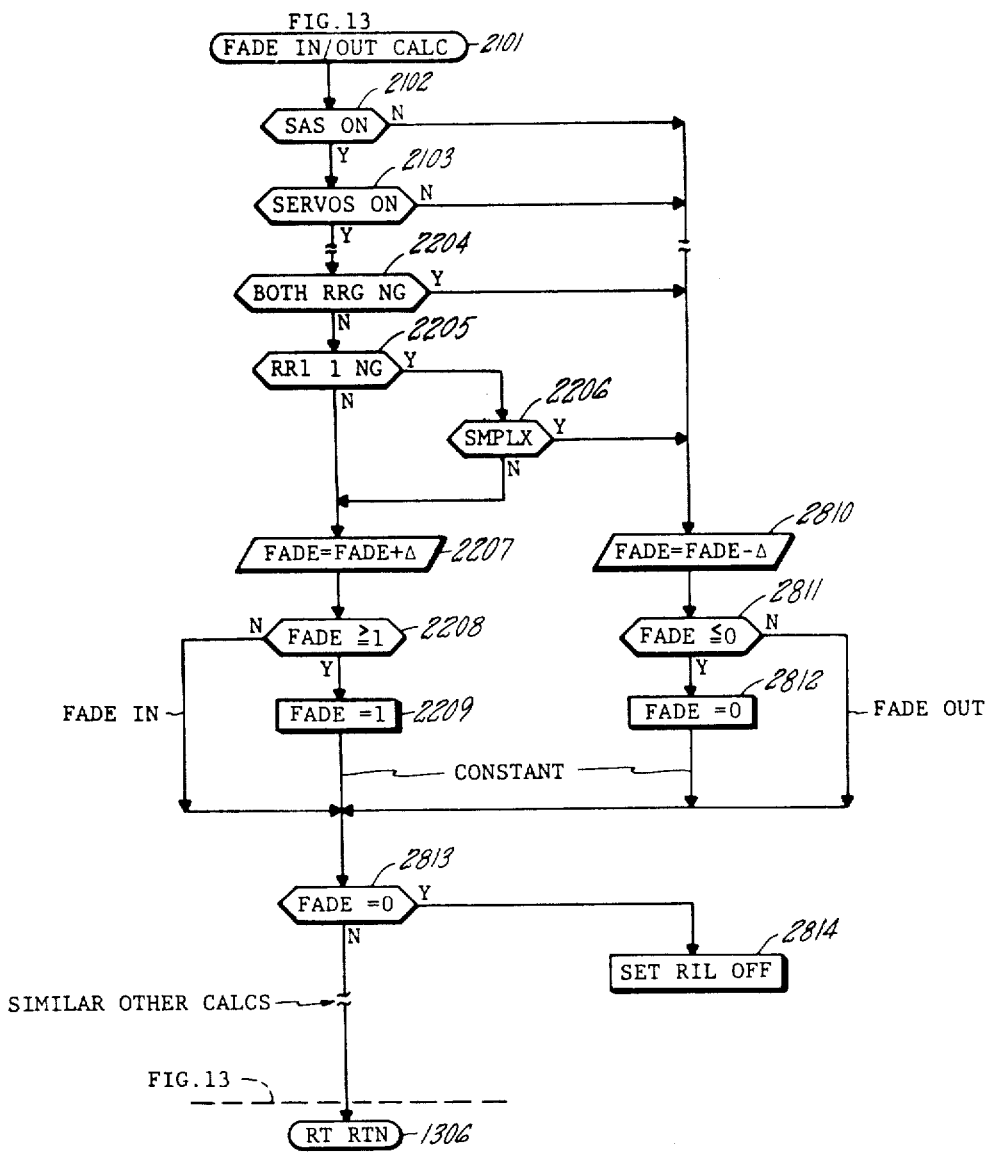

COMPLEMENTARY COMMANDS IN FAIL-OPERATIONAL, FAIL-SAFE MULTI-COMPUTER CONTROL SYSTEM

The invention disclosed herein was made in the course of or under a contract with the Department of the Navy.

CROSS REFERENCE TO RELATED APPLICATIONS

This application is related to commonly owned, copending applications of the same inventors as follows: it is a division of Ser. No. 938,583 filed on Aug. 31, 1978, now U.S. Pat. No. 4,270,168, SELECTIVE DISABLEMENT IN FAIL-OPERATIONAL, FAIL-SAFE MULTI-COMPUTER CONTROL SYSTEM, and some of the subject matter herein is claimed in other divisional applications filed on May 19, 1980, Ser. No. 151,486, SIMPLEX OPERATION IN FAIL-OPERATIONAL, FAIL-SAFE MULTI-COMPUTER CONTROL SYSTEM; Ser. No. 151,487, SELECTIVE REDUNDANT INPUTS IN FAIL-OPERATIONAL, FAIL-SAFE MULTI-COMPUTER CONTROL SYSTEM; and Ser. No. 151,489, SYNCHRONIZED, FAIL-OPERATIONAL, FAIL-SAFE MULTI-COMPUTER CONTROL SYSTEM.

BACKGROUND OF THE INVENTION

1. Field of Art

This invention relates to computer control systems, and more particularly to fail-operational, fail-safe multi-computer control systems.

2. Description of the Prior Art

The concepts of self test, redundancy, cross-check verification between various sources of information and the like are all well known in the art. Particularly, with the advent of complex digital computer systems which are implementable in relatively compact form, the full utilization of these techniques has been approached in a variety of different configurations utilizing all sorts of philosophies.

An example of such a system is illustrated in Eccles U.S. Pat. No. 4,032,757, which employs a pair of separate "lanes" or channels, and does much comparing by two separate computers of the events occurring in the two channels. The problem with this sort of a system is that should one computer be itself faulty, and in the process of checking the other, non-faulty computer, decide that the other computer cannot be relied upon, the faulty computer can provide predominance in the further control of the system, whatever it may be. Obviously, in the case of control systems for operating aircraft, critical industrial processes, high-rise elevators and the like, such results could lead to serious injury or death. Similarly,, there are many process control systems in which a failure on the part thereof to properly maintain control could result in violent reactions, gross waste of valuable raw products, and the like.

A further problem with super-safe, self checking computers, and more particularly with computers which check each other or otherwise compare results before use, is the need for real-time instantaneous control of the system itself. The inter-computer communication, internal data moves and calculations have frequently consumed too much time to permit checked utilization of up-to-date data and instantaneous control of critical systems.

SUMMARY OF THE INVENTION

Objects of the present invention include provision of improved fail-operational, fail-safe multi-computer control systems, such systems in which there is barely an infinitesimal chance that the computers themselves can fail in a manner to render harmful operation of the relevant control system possible; such systems in which substantially instantaneous real time utilization of updated information is provided.

In accordance with the invention, a multi-computer process control system provides self-testing, redundant comparison, and shedding faulty outputs.

According to the present invention, a control system utilizes plural computer systems for controlling outputs, each computer system having a disabled mode of operation in which it provides no control over the outputs, a data link for communicating between the computers, said data link exchanging information of computer status and calculated results, wherein each computer is normally in an operational mode but may assume a disabled mode in response to failure of any of its self tests, and when all computers are in the operational mode they compare calculated results with one another. According further to the invention, each computer provides a feedback test comparison between calculated commands and the effect which such commands have on the output relating thereto, and disables the related output if the test fails, providing a status indication thereof to itself and another one of said computer systems. In still further accord with the present invention, each computer normally calculates a share of the desired output command, but in the case of status indication of a failed output, the computer having the failed output will provide a zero output, whereas the other computer system will provide a full command to its output.

In accordance with the invention, a plurality of computers include a plurality of specific self tests, each computer capable of assuming the disabled mode in the event that it should fail any of its self tests, each computer checking its answers with that of another computer when not disabled.

The foregoing and other objects, features and advantages of the invention will become more apparent in the light of the following description of an exemplary embodiment of the invention as shown in the accompanying drawing.

BRIEF DESCRIPTION OF THE DRAWING

FIG. 6 is a logic flowchart of a real time interrupt entrance and return program for the embodiment of FIG. 1;

FIGS. 7-10 are logic flowcharts of the respective first through fourth real time interrupt programs for the embodiment of FIG. 1;

FIG. 21 is a simplified fade in/out calculation subroutine for use in the program of FIG. 13.

DETAILED DESCRIPTION

The description herein is in many instances simplified by use of short, nemonic terminology, all of which is identified in a table of nomenclature, set forth hereinafter.

Figure 1:
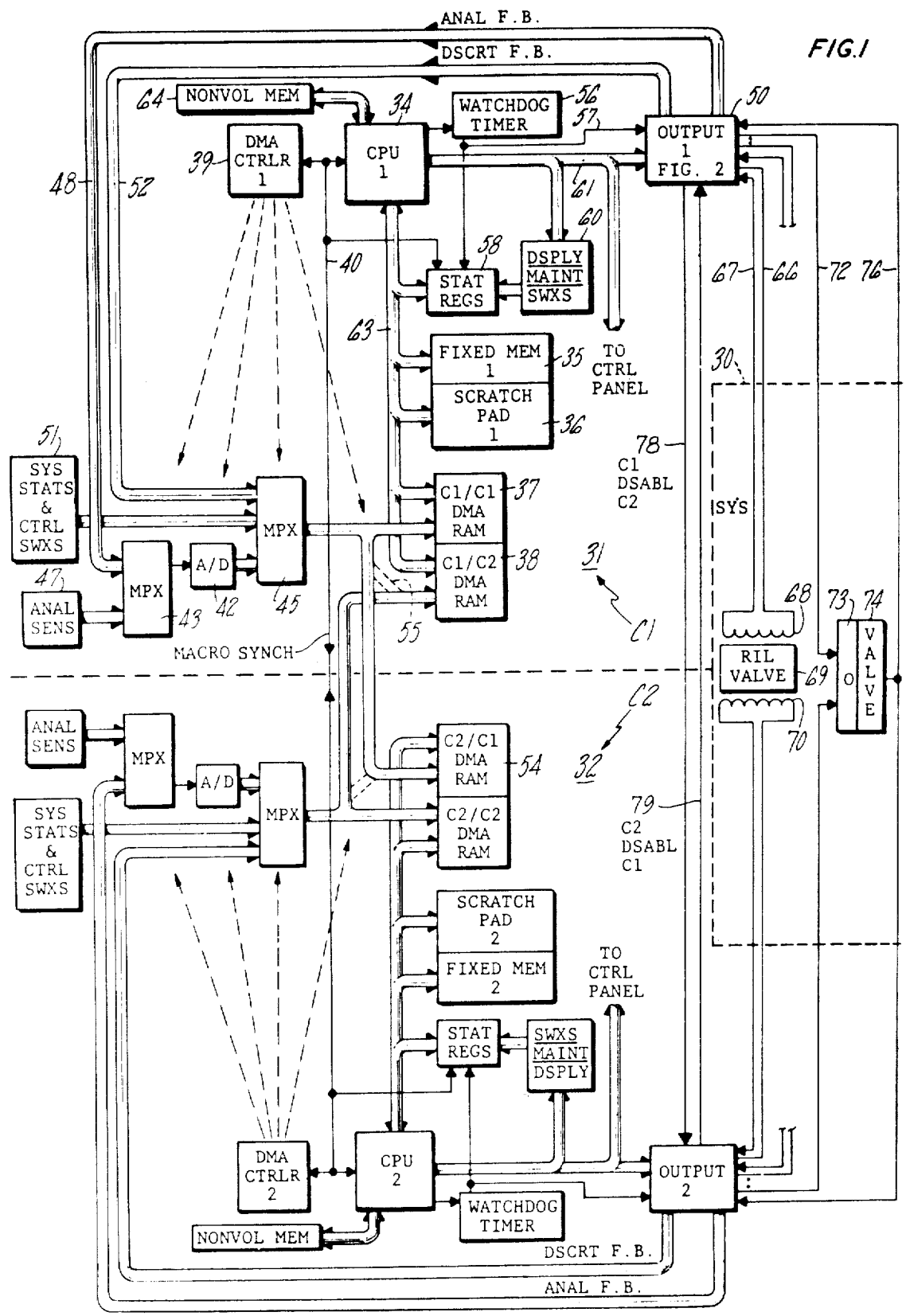
FIG. 1 is a schematic block diagram of a dual computer, aircraft control system embodiment of the present invention.

Referring now to FIG. 1, an exemplary embodiment of the present invention utilizing two computer systems to provide fail-operational, fail-safe control over the flight control system of an aircraft, such as a helicopter, is shown in simplified schematic block diagram form. In FIG. 1, exemplary portions of an aircraft flight control system 30 are controlled by a first computer system 31, referred to hereinafter as computer 1 or C1, and a second computer system 32, referred to hereinafter as computer 2 or C2. As used herein, the numeral "1" or designation "C1" associated with any particular apparatus or function designates relationship with computer 1, 31 (and concomitantly for computer 2). The description herein is given in the context of computer 1 only, computer 2 being absolutely identical thereto. As is described more fully hereinafter, there is no difference between the two, each is absolutely identical and totally replaceable one for the other. The program in either will work in the other, the addresses in one designate the same things as the addresses in the other, and so forth. There is no master/slave relationship whatsoever. The only difference between the two is that there is a designation of one as being 1 and the other as being 2, more to identify the equipment bay in which the apparatus is located, and therefore which switches and indicators refer to which equipment on a central or common control panel which is associated with the system 30 and includes functions and displays respectively relating to each of the systems 31, 32. For that reason, the description of computer 1 will be given, it being understood that it is completely applicable to computer 2; in fact, wherever 1 appears, the term "self" could be substituted and wherever "2" appears, the term "other" could be substituted, and then the description would be totally apt for either system 31, 32.

NOMENCLATURE

1 = Associated w. C1 (=SELF)
2 = Associated w. C2 (=OTHER)
ACC = Accelerometer
ACCEL = Accelerometer
A/D = Analog-to-digital
ADR = Address
ANAL = Analog
ATT = Attitude
AUG = Augmentation
AVG = Average BG = Background program
BITE = Built-in Test, or Built-in Test Equipment
BOTH = C1 and C2, self and other C1 = Computer 1 (=SELF)
C2 = Computer 2 (=OTHER)
CALC = Calculate, calculation
CHK = Check
CLR = Clear
CMND = Command
CMPR = Compare
COEF = Coefficient
COLL = Collective Pitch
CPU = Central processing unit
CRIT = Critical
CTR = Counter
CTRL = Control
CTRLR = Controller D/A = Digital-to-analog
DECR = Decrement
DMA = Direct Memory Access
DSABL = Disable
DSCRT = Discrete
DSPLY = Display EN = Enable
EXEC = Executive program control FAS = Force Augmentation System
FB = Feedback
FLT = Fault GRND = Ground (Earth Surface, Not Elec.)

INCR = Increment
IRPT = Interrupt

LAT = Lateral

MAINT = Maintenance
MEM = Memory
MS = Milliseconds

N = No
NG = No good
NON-SERV = Non-service mode
NORM = Normal

OTHER = Computer 2

PWR = Power

RAM = Random Access Memory
RIL = Roll inner loop
ROL = Roll outer loop
RR = Roll rate gyro related
RRT = Roll Rate RRG=Roll Rate Gyro
RST=Reset
RSTR=Restore
RUTN=Routine SELF=Computer 1
SERV=Service mode
SMP/DUP=Simplex and/or Duplex
SMPLX=Simplex
STAT=Status
SWX=Switch
SYS=System being controlled TOF=Turn off
TON=Turn on
TST=Test VERT=Vertical
VG=Vertical gyro WD=Word
WRAP=Wraparound test or configuration XS=Excess (more than full count)

Y=Yes

This is an important feature of the invention, since there is absolutely no master/slave relationship whatsoever, each system operating with complete autonomy and authority insofar as its program not being subservient to that of the other is concerned.

Referring now and hereinafter almost exclusively to the computer system 31, designated as C1, there is provided a CPU 34 capable of the normal arithmetic and logic, program and interrupt, memory access and output functions, which includes a master clock utilized generally throughout the system 31. The CPU 34 has associated with it a fixed memory 35, a scratch pad memory 36 and a pair of random access memories 37, 38 which are reachable by a direct memory access controller 39. The DMA controller 39 is synchronized to the CPU 34 by means of the CPU's master clock, and in particular by means of a MACRO SYNCH interrupt clock signal provided on a line 40, which also provides synchronism between the two systems. The CPUs in both systems each have their own master clock circuitry, operating on a frequency designed to be identical with that of the other. However, as is described more fully hereinafter, synchronization between systems and between each CPU and its related DMA controller is accomplished only once in every five utility program performances, by a specific timing signal designated as MACRO SYNCH (MS), which is utilized as the first of the utility program interrupts in both systems, and as the kick off point for the program of the DMA controller which, being controlled by the master clock of the related CPU, is very accurately timed therewith to provide data moves without utilizing CPU processing time, and without holding up any CPU processing operations. Either CPU can in fact provide the controlling MACRO SYNCH (and other clock signals) between both CPUs and DMA controllers, in dependence upon which is the first to occur; the occurrence of the first one (through suitable race-preventing circuitry of an well known type) automatically resets the other so that both master clocks are tracking insofar as the initialization of MACRO SYNCH interrupts are concerned. In fact, since either MS will serve both computers, it matters not if one MS fails, the other will serve. So no major shutdown need occur due to failure of only one MS. As is described more fully hereinafter, it is a feature of the present invention that utilization of real time interrupts to perform utility programs avoids the necessity of precise synchronization between computer systems, and also provides a simple manner of adequate synchronization between each CPU and the DMA controller; this feature also permits maximum, flat-out utilization of CPU time either for utility programs or for a maximum amount of self checking program execution during a background job which is interrupted in order to handle the utility programs.

The DMA controller 39 controls the function of an A/D converter 42, an input analog multiplexer therefor 43, and a system input multiplexer 45 which can select between the A/D converter output and other digital or discrete inputs for application to the system. The multiplexer 43 is responsive on the one hand to analog sensors 47 and to analog feedback signals on lines 48 provided by output circuitry 50 and indicative of actual response to commands provided to the system 30. The A/D converter 42 may include AC demodulation circuitry as necessary, as well as voltage to digital conversion circuiry, all in a well known fashion. In addition to the A/D converter 42, the multiplexer 45 may respond to a variety of system status lines and control switches 51 as well as discrete indications on lines 52 from the output circuitry 50. The DMA controller 39 provides two types of data moves. One type is from the multiplexer 45 into identical slots of memories 37 and 54. Memory 37 is designated C1/C1 in FIG. 1 to indicate that this is a memory in C1 for storing data originating either within C1 itself or within its associated inputs and/or output feedbacks. This first type data move also applies the same data from the multiplexer 45 into an identical slot in a DMA random access memory 54 in C2, which is designated as C2/C1 in FIG. 1 to indicate that it is a memory in C2 which receives information generated by C1 or by its inputs or feedbacks.

The DMA controller 39 also provides data moves from C1/C1 to C1/C2. This type of data move is used during a wraparound data link test to move data from the memory 37 to the memory 38 (and concomitantly in C2) after a transfer of lines has been made as indicated by the dotted lines 55 in FIG. 1, thereby to permit moving known data from the memory 37 to the memory 38 which, after checking, will determine in some degree the health of the data paths involved. The utilization of this test is described more fully hereinafter. The CPU 34 has a watchdog timer 56 of a known type which has to be reset periodically by reaching a certain point in the program, or it will establish an alarm on a line 57 which is applied directly to fast-access status registers 58 and to the output circuits 50 for use in shutting down the system, as is described more fully with respect to FIG. 2 hereinafter. The status registers 58 also receive inputs from maintenance switches in a maintenance panel 60, which also has displays responsive to outputs from the CPU on a data bus 61. These outputs on the bus 61 may also be applied to an operator control panel (such as a pilot's panel in a cockpit of an aircraft, or the system control panel of any system using the present invention). The outputs on the bus 61 may be OR'd with like outputs from the other computer, if desired. The computer 34 has access to any of its memories 35-38 through a data bus 63. The CPU 34 is also associated with a small, nonvolatile memory 64 (such as magnetic cores), the contents of which is preserved even through power down intervals. This is utilized to store critical status indicators of the related computer, and is updated periodically, and whenever the related computer is disabled; it also stores input device nulls.

The output circuit 50 provides, inter alia, current through a closed loop pair of lines 66, 67 to the control coil 68 of a hydraulic servo trim valve 69 which is also responsive to a coil 70 controlled by C2. In normal operation, each coil would provide half of the magnetic force on the servo or trim valve necessary for a desired response; in either simplex operation or if one coil fails, one coil would provide a full command to induce the magnetic force necessary for the desired response, while the other coil would contribute nothing. The valve 69 is designated RIL (roll inner loop) in FIG. 1; this is only one of a number of such valves which may be provided in a helicopter control system, but which is described more fully hereinafter.

An additional type function of the output circuitry 50 is provision of a discrete drive signal on a line 72 which may operate an OR circuit 73, which in turn opens a main hydraulic valve to enable operation of a hydraulic servo system used in the control of the aircraft. The OR circuit 73 may be operated conjointly or alternatively by a like signal from C2. Instead of an OR circuit, an AND circuit may be used for dangerous functions, requiring both C1 and C2 to participate. Whether or not the valve has opened is indicated by a discrete signal on a line 76 which carries the information back to the output circuitry 50. The valves 69, 74 are illustrative merely of large numbers of such valves which may be controlled in accordance with the teachings herein. Alternatively, of course, electromechanical actuators, pneumatic valves, selsyns, or other forms of actuators may obviously be controlled by a system of the type described herein, the valves shown being merely exemplary.

As described briefly hereinbefore, one of the most prominent features of the present invention is that each computer is autonomous and is in no fashion a slave to the other. Each computer has the capability of disabling itself in the event that its own self tests fail, including the memory check sum of every bit of the critical portions of fixed memory 35 and the scratch pad test of the critical portions of the scratch pad memory 36, as well as the wraparound data link check and other critical tests performed during processing. In addition, in any event where the two computers do not agree with one another, some action is taken. In cases where further testing could resolve the difficulty, and determine which computer is at fault, such tests are performed. In the case of disagreement of inputs, either computer may decide that either its inputs or the other inputs are faulty, and take the faulty input device off line. Either computer may decide that one of its outputs is faulty and disable it. And either computer may decide that it is faulty by virtue of its own self test and take itself off line. But if, after further testing, the problem of which computer's input or which computer is at fault isn't resolved, then both input devices, or both computers are taken off line (disabled). Another feature of the system according to the invention is that, in the event of an unresolved conflict between the two computers, each computer may take both off line, but only be ensuring that it disables the other computer simultaneously with disabling itself. The disabling of the other computer is accomplished by a hard-wire connection 78 from the output circuitry 50 of computer 1 to similar circuitry in computer 2 and by a hard-wire connection 79 from the output of computer 2 to the output circuitry 50 of computer 1. This is in addition to status words that may be lodged in the opposite computer by means of normal data moves of discrete signals, by the DMA.

Figure 2:
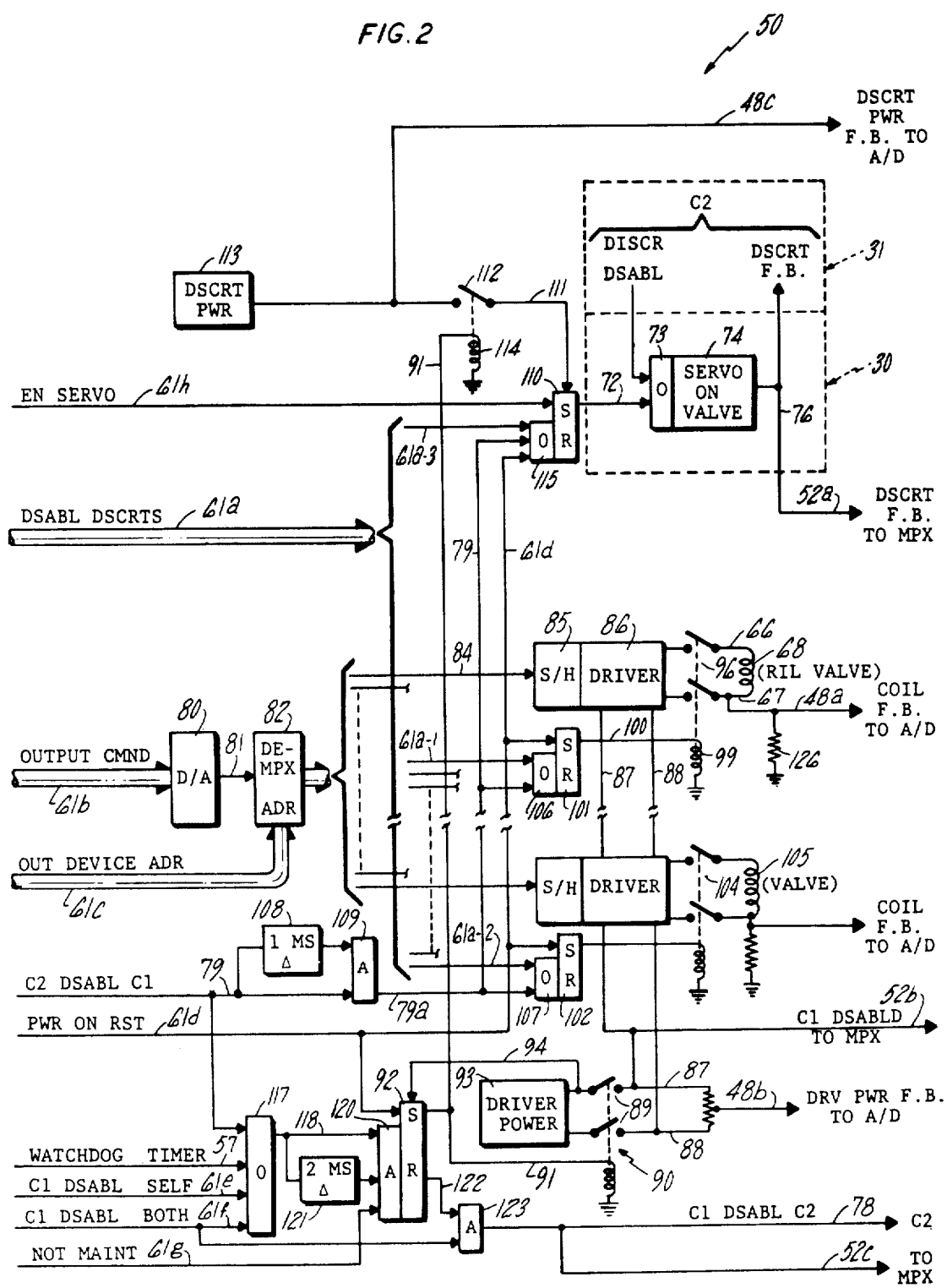
FIG. 2 is a simplified schematic block diagram of output circuitry for use in the embodiment of FIG. 1.

Referring now to FIG. 2, the output circuitry 50 includes an output digital to analog converter 80, responsive to digital output commands on lines 61b associated with the computer output bus 61 in FIG. 1, to provide an analog output signal of proper scale and magnitude on a line 81 for distribution as determined by a de-multiplexer 82 in response to an output device address applied thereto on a bus 61c, which is also associated with the computer output bus 61 in FIG. 1. Referring specifically to the roll inner loop control valve 68, the de-multiplexer 82 will provide an analog signal on a line 84 which is stored in a sample and hold (or track store) circuit 85, the output of which is suitably driven by a driver 86, which in the present embodiment is bilateral, operating in response to balance the positive and negative voltages (such as ± 19 volts on a pair of lines 87, 88). The lines 87, 88 are in turn energized through respective contacts 89 of a power sever relay 90, which is normally open, and maintained in an energized condition by a signal on a line 91 from the set side of a latch 92, which is normally set. The contacts 89 are in turn energized by a suitable driver power supply 93, an output of which on a line 94 may also be used to provide power to the latch 91, thereby ensuring that the output of the latch on the line 91 will disappear in the event of failure of the power driver 93, thereby disabling all of the drivers 87, 88 in a symmetrical fashion so their outputs will go to zero, while at the same time providing to C1 disabled discrete output on the line 52(b) to the multiplexer 45 (FIG. 1). Otherwise, the drivers fed by lines 87, 88 may have continued to operate in an imbalanced fashion and provided faulty outputs.

The driver 86 feeds the lines 66, 67 to provide the precise current commanded for the valve coil 68 through relay contacts 96, which are normally open, and are closed only through energization of an associated relay coil 99. The relay coil 99 is normally energized by a signal on a line 100 provided by the set side of a latch 101. Other valves are similarly driven through contacts, the coil of which is energized by latches, such as a latch 102. Removal of power to the relay coil 99 causes the conacts 96 to open, thereby ensuring that there is no current through the coil 68, which thereby disables the output of computer 1, insofar as that coil is concerned. Similarly, if the latch 102 is reset, relay contacts 104 related to a servo valve coil 105 will open, ensuring that the valve coil 105 will have no current through it. The latches 101, 102 may be individually, selectively reset so as to disable only the associated coil (68, 105,, respectively) by discrete output disable signals on related lines 61a-1 and 61a-2, and so forth. These latches may also be reset, in response to OR circuits 106, 107, altogether as a single unit in consequence of the C2 disable C1 signal on the line 79, which comes directly from computer 2, after ensuring it has a 1 MS duration by means of a 1 MS delay 108 and on AND circuit 109, to provide a signal on a line 79a. Similarly, the outputs to the valve coils 68, 105 may be faded down to zero individually, or successively, by providing suitable output command words on the bus 61b through the multiplexer 82. Thus the sample and hold 85 can be set to zero in any case where the coil 68 is desired to be not energized by computer 2, in the case of degraded operation without one or a few outputs. Or, all of the sample and hold circuits may be successively set to zero by repetitive, suitable output commands through the D/A converter 80 and the de-multiplexer 82. In the case of closing down one output, the digital word supplied to the D/A is faded out slowly, because C1 can be trusted, and operation is smooth. But in disable operations, the computer cannot be trusted to fade out slowly, so the D/A is driven to zero all at once, for all outputs. The latches 92, 101, 102 are initially set, so as to energize the associated relay coils 90 . . . 99 in response to a power-on-reset discrete signal on a line 61d, which may form a part of the CPU output bus 61 shown in FIG. 1.

There has thus been initially described four ways for the coils 68, 105 to be disabled and provide no further system response: The coil circuits may be opened one at a time by output disable discretes or altogether by the C2 disable C1 signal; the drivers may have their voltages removed by the relay contacts 89, or the sample and hold circuits (such as 85) may be driven to zero.

Similar controls are provided for the servo valve 74 referred to briefly with respect to FIG. 1 hereinbefore. Specifically, a latch 110 may be set in response to a suitable enable servo discrete signal on a line 61 (associated with the CPU output bus 61 in FIG. 1) to provide the signal on the line 72 to the OR circuit 73 to enable the servo on valve 74. The latch 110 may be reset in the case that power thereto is lost from a line 111 which is fed through a relay contact 112 by a discrete power source 113, the relay contact 112 being normally open and maintained closed by current through its associated coil 114 in response to current on the line 91 (described hereinbefore). The latch 110 can be reset by an OR circuit 115 in response to a discrete disable signal on a line 61a-3, in response to the C2 disable C1 signal on the line 79a, or in response to a power-on-reset signal on the line 61d. The latches 92, 101, 102, 110 are illustrative merely, and may take the form of suitable flip flops feeding adequate driver amplifiers, or other circuitry as best suits any particular implementation of the present invention, so long as the logical functions described herein are amply provided thereby.

The disable control circuitry per se is shown in the lower left of FIG. 2. This includes an OR circuit 117 which is responsive to the output from the watchdog timer on the line 57, a disable self signal from computer 1 on the line 61e, a disable both signal from computer 1 on a line 61f, or the C2 disable C1 signal on a line 79. The OR circuit 117 provides a signal on a line 118 to an AND circuit 120, and through a 2 millisecond delay circuit 121 to the same AND circuit 120. The AND circuit 120 may be blocked during maintenance operations if desired, by a signal on a line 61g. If not blocked by a maintenance signal, the AND circuit 120 will operate 2 milliseconds after the signal on line 118 appears, provided it is still there at the end of the 2 millisecond period. This ensures that whatever signal operated the OR circuit 117, it should be a steady signal and not just a short noise spike. The AND circuit 120 will reset the latch 92 so as to cause the signal on the line 91 to disappear, thereby releasing the relay contacts 89, and de-energizing the drivers (such as 86). When reset, the latch 92 will provide a signal on a line 122 to an AND circuit 123 which is also responsive to the C1 disable both signal on the line 61f; this ensures that in the case of computer 1 deciding to disable both computers, it is not effective to provide the C1 disable C2 signal on the line 78 until it ensures at least one of the modes of disablement have taken place by resetting of the latch 92 to provide the signal on the line 122. Of course, the set state of the latch 92 may be used along with an inverter to provide the C1 disable C2 signal on the line 78, and similarly, the reset side may be used through an inverting amplifier to drive the relay coils 90, 114. Other suitable, commensurate logical arrangements may be made in a wide variety of fashions in dependence upon the particular circuits which are desired to be used in implementing any embodiment of the present invention.

The output circuitry 50 of FIG. 2 also provides discrete feedback signals and analog feedback signal to the input of computer 1 so that it may monitor the health of its output circuits. Specifically, a discrete output signal on a line 52a derived from the feedback line 76 provides a discrete feedback signal indicative of the servo ON valve 74 being energized, to the multiplexer 45 of computer 1 (FIG. 1). The C1 disable C2 signal on the line 78 may also be provided as a discrete input to the multiplexer 45 in FIG. 1 over a line 52c, and the fact that the driver voltages have been removed by the contacts 89 may be monitored by a C1 disabled discrete signal applied to the multiplexer 45 over a line 52b (FIG. 1). Further, analog signals may be provided from the circuitry of FIG. 2 to the input of the analog multiplexer 43. For instance, the actual voltage value of the discrete power supply 113 may be provided on a line 46c; a voltage indicative of the voltage output on the lines 87, 88 from the driver power supply 93 may be provided on the line 48b; if the driver power is balanced to ground, the line 48b may be attached across a load resistance in such a fashion as to provide a specific discrete positive or negative voltage (such as +5 volts) indicative of normal balanced voltage on the lines 87, 88. Each of the servo valve coils (such as 68) may be provided with a current-to-voltage converting resistor 126 to supply a voltage on a line 48(a) to the input of the A/D converter multiplexer 43 indicative of the actual current through the coil, for comparison with the command supplied thereto, in feedback tests which are described hereinafter.

Figure 3:
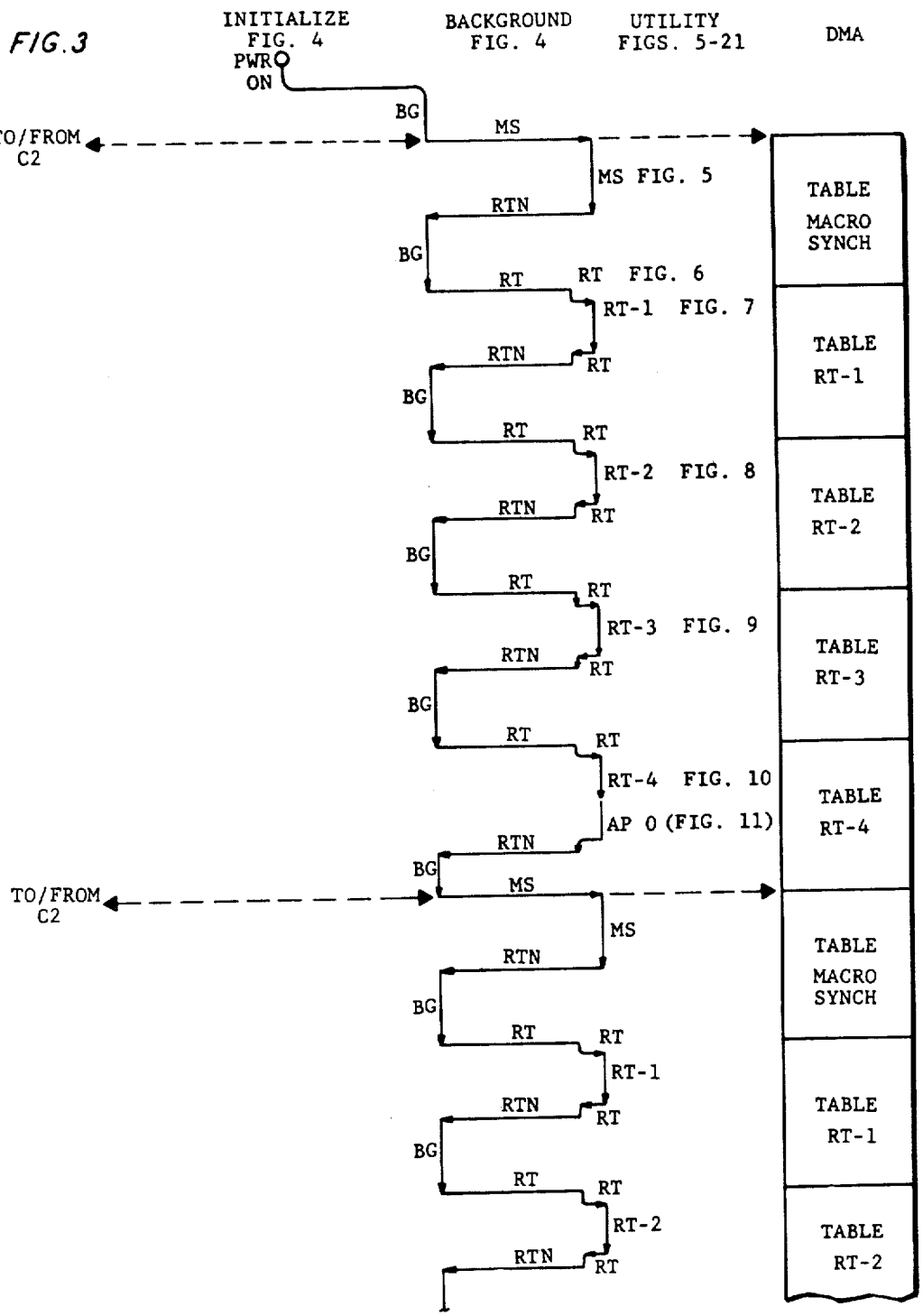
FIG. 3 is a diagrammatic illustration of the relationship between the background program, utility program and the DMA controller machro program in the embodiment of FIG. 1.

Referring now to FIG. 3, and considering the computer architecture described briefly in FIG. 1, the present invention is implemented with programming which relies on real time interrupts to break into a background program (BG) of self testing to perform utility programs which include operational and self tests, and to synchronize these utility programs with a program of operation for the related DMA. The background program bears no synchronism with the utility programs or the DMA. The background program is interrupted repetitively; about 100 times per BG iteration. On the order of half of the computer time is used for the background program and half of the computer time is used for the utility programs, during duplex mode. This arrangement (as illustrated in FIG. 3) provides for a solid intermix of background program self testing with utility programming, and with no loss of computer time whatsoever. This is achieved without any close tolerance on the timing of the utility program, and with no relationship whatsoever between the background program and the utility program. A feature of the invention is that, after full memory testing during initialization, only those poritons of fixed memory 35 and scratch pad 36 that are used in the simplex mode for inner loop stability (what the pilot needs most) is checked by the background program; the remaining memory portions are checked only by intercomputer redundant comparisons. The utility programming is accomplished in five different type of interrupts, one being designated as MACRO SYNCH, the other four being designated as real time interrupts and utilizing a common entry and exit program (RT) for certain housekeeping functions. However, other than the fact that each program is distinct, there is no difference between the MACRO SYNCH program and the real time interrupt programs (RT1–RT4). But the fourth real time interrupt (RT-4) itself may operate any one of four subprograms designated AP0 through AP3, as illustrated briefly in FIG. 3.

The DMA macro program is organized to complete its entire repertoire in exactly the same time frame as exists between two of the MACRO SYNCH interrupts, which are carefully controlled by the master clock of either one or the other of the computers, depending upon which one is infinitesimally higher in frequency than the other. Since the DMA operates on the same master clock as the computer, it will remain synchronous with the MACRO SYNCH interrupts thereof. The timing of each of the individual utility programs may vary to some extent, but this is of no moment since the degree of synchronization which the utility program must bear to the DMA is easily accommodated by the fact that the utility programs are synchronized once for each DMA program, by the MACRO SYNCH signal.

The tables referred to in FIG. 3 and presented hereinafter indicate an exemplary DMA macro program (the detail program for implementing the data moves illustrated in the tables being obvious to those skilled in the art), which may accommodate the types of programs described briefly herein for illustrative purposes.

It should be borne in mind that the particular computer architecture, use of a DMA controller, the particular analog and digital input arrangements, and the manner of establishing communication between the two computers may be modified in a variety of ways to take advantage of the present invention. However, further aspects of the invention include some of the features which relate to the specific computer architecture and relationsips between the data link and certain of the related tests herein. These will become more apparent in the following description.

| SOURCE | DESTINATION | | DEFINITION |
|---|---|---|---|
| | | DMA DATA MOVE PROGRAM - MACRO SYNCH | |
| A/D | C1/C1 | C2/C1 | LONG STICK POS |
| A/D | C1/C1 | C2/C1 | YAW TRIM POS |
| A/D | C1/C1 | C2/C1 | COLL TRIM POS |
| DISCRETE | C1/C1 | C2/C1 | |
| C1/C1 | C2/C1 | | F.B. STATS |
| C1/C1 | C2/C1 | | F.B. STATS |
| SPARE | | | |
| SPARE | | | |
| SPARE | | | |
| SPARE | | | |
| SPARE | | | |
| SPARE | | | |
| SPARE | | | |
| SPARE | | | |
| C1/C1 | C2/C1 | | FAS OUTPUT CMD |
| C1/C1 | C2/C1 | | ROLL TRIM CMD |
| C1/C1 | C2/C1 | | YAW TRIM CMD |
| A/D | C1/C1 | C2/C1 | ROLL GYRO |
| A/D | C1/C1 | C2/C1 | ROLL RATE GYRO |
| C1/C1 | C2/C1 | | COLL TRIM CMD |
| A/D | C1/C1 | C2/C1 | LAT ACCEL |
| | | DMA DATA MOVE PROGRAM - REAL TIME 1 | |
| A/D | C1/C1 | C2/C1 | DIR GYRO |
| A/D | C1/C1 | C2/C1 | YAW RATE GYRO |
| A/D | C1/C1 | C2/C1 | 15 VOLT INTERNAL POWER |
| A/D | C1/C1 | C2/C1 | DC BUS MONITOR |
| A/D | C1/C1 | C2/C1 | DISCRETE POWER |
| A/D | C1/C1 | C2/C1 | 15V SENSOR EXCITATION |
| A/D | C1/C1 | C2/C1 | 5V CPU POWER |
| A/D | C1/C1 | C2/C1 | 15V CPU POWER |
| A/D | C1/C1 | C2/C1 | 400 HZ AC POWER REF |
| A/D | C1/C1 | C2/C1 | 400 HZ AC BUS |
| A/D | C1/C1 | C2/C1 | SYNCHRO CONVERSION TEST |
| A/D | C1/C1 | C2/C1 | SYNCHRO MONITOR TEST |
| A/D | C1/C1 | C2/C1 | 19V OUTPUT DRIVE POWER |
| A/D | C1/C1 | C2/C1 | RAD ALT RATE |
| C1/C1 | C2/C1 | | ROLL INNER LOOP CMND |
| C1/C1 | C2/C1 | | YAW INNER LOOP CMND |
| A/D | C1/C1 | C2/C1 | VERT GYRO (PITCH) |
| A/D | C1/C1 | C2/C1 | PITCH RATE GYRO |
| A/D | C1/C1 | C2/C1 | LONG ACCEL |
| | | DMA DATA MOVE PROGRAM - REAL TIME 2 | |
| A/D | C1/C1 | C2/C1 | VERT ACCEL |
| A/D | C1/C1 | C2/C1 | RATIO ALTITUDE |
| A/D | C1/C1 | C2/C1 | BARO ALTITUDE |
| A/D | C1/C1 | C2/C1 | BARO ALT RATE |
| A/D | C1/C1 | C2/C1 | RAD ALT SET POT |
| C1/C1 | C2/C1 | | PITCH AUTOPILOT INTEGRATOR |
| C1/C1 | C2/C1 | | ROLL AUTOPILOT INTEGRATOR |
| C1/C1 | C2/C1 | | YAW AUTOPILOT INTEGRATOR |

-continued

| SOURCE | DESTINATION | | DEFINITION |
|---|---|---|---|
| C1/C1 | C2/C1 | | COLL AUTOPILOT INTEGRATOR |
| C1/C1 | C2/C1 | | PITCH INNER LOOP CMD |
| C1/C1 | C2/C1 | | COLL INNER LOOP CMD |
| A/D | C1/C1 | C2/C1 | BIAS ACTUATOR POSITION |
| A/D | C1/C1 | C2/C1 | AIRSPEED |
| A/D | C1/C1 | C2/C1 | LONG STICK POSITION |
| | | | DMA DATA MOVE PROGRAM - REAL TIME 3 |
| SPARE | | | |
| A/D | C1/C1 | C2/C1 | SPARE A/D INPUT |
| A/D | C1/C1 | C2/C1 | SPARE A/D INPUT |
| A/D | C1/C1 | C2/C1 | SPARE A/D INPUT |
| A/D | C1/C1 | C2/C1 | SPARE A/D INPUT |
| A/D | C1/C1 | C2/C1 | SPARE A/D INPUT |
| A/D | C1/C1 | C2/C1 | GROUND TEST D/A F.B. |
| A/D | C1/C1 | C2/C1 | ROLL TRIM COIL CURRENT (F.B.) |
| A/D | C1/C1 | C2/C1 | YAW TRIM COIL CURRENT (F.B.) |
| A/D | C1/C1 | C2/C1 | COLL TRIM COIL CURRENT (F.B.) |
| A/D | C1/C1 | C2/C1 | ROLL SERVO COIL CURRENT (F.B.) |
| A/D | C1/C1 | C2/C1 | ROLL SERVO COIL CURRENT (F.B.) |
| A/D | C1/C1 | C2/C1 | YAW SERVO COIL CURRENT (F.B.) |
| A/D | C1/C1 | C2/C1 | YAW SERVO COIL CURRENT (F.B.) |
| A/D | C1/C1 | C2/C1 | PITCH SERVO COIL CURRENT (F.B.) |
| A/D | C1/C1 | C2/C1 | PITCH SERVO COIL CURRENT (F.B.) |
| A/D | C1/C1 | C2/C1 | COLL SERVO COIL CURRENT (F.B.) |
| A/D | C1/C1 | C2/C1 | COLL SERVO COIL CURRENT (F.B.) |
| C1/C1 | C2/C1 | | FAS CMND |
| C1/C1 | C2/C1 | | BIAS ACTUATOR CMD |
| | | | DMA DATA MOVE PROGRAM - REAL TIME 4 |
| DISCRETE | C1/C1 | C2/C1 | |
| DISCRETE | C1/C1 | C2/C1 | |
| DISCRETE | C1/C1 | C2/C1 | |
| A/D | C1/C1 | C2/C1 | FAS COIL CURRENT (F.B.) |
| A/D | C1/C1 | C2/C1 | BIAS ACTUATOR VOLTAGE (F.B.) |
| A/D | C1/C1 | C2/C1 | FAS DIFFERENTIAL PRESSURE |
| DISCRETE | C1/C1 | C2/C1 | |
| DISCRETE | C1/C1 | C2/C1 | |
| A/D | C1/C1 | C2/C1 | HEADING TRIM CMD |
| A/D | C1/C1 | C2/C1 | ROLL STICK POSITION |
| A/D | C1/C1 | C2/C1 | PEDAL POSITION |
| C1/C1 | C2/C1 | | NONVOLATILE STORAGE WORDS BITE CODE |
| C1/C1 | C2/C1 | | NONVOLATILE STORAGE WORDS BITE CODE |
| C1/C1 | C2/C1 | | NONVOLATILE STORAGE WORDS BITE CODE |
| C1/C1 | C2/C1 | | NONVOLATILE STORAGE WORDS BITE CODE |
| C1/C1 | C2/C1 | | NONVOLATILE STORAGE WORDS BITE CODE |
| C1/C1 | C2/C1 | | NONVOLATILE STORAGE AFCS ENGAGE STATUS |
| C1/C1 | C2/C1 | | SPARE |
| C1/C1 | C2/C1 | | NONVOLATILE STORAGE PITCH RATE GYRO NULL |
| C1/C1 | C2/C1 | | NONVOLATILE STORAGE ROLL RATE GYRO NULL |
| C1/C1 | C2/C1 | | NONVOLATILE STORAGE YAW RATE GYRO NULL |
| C1/C1 | C2/C1 | | NONVOLATILE LNG ACCEL GYRO NULL |
| C1/C1 | C2/C1 | | NONVOLATILE MEMORY TRACKED LAT ACCEL NULL |
| C1/C1 | C2/C1 | | NONVOLATILE MEMORY LAT ACCEL NULL |
| C1/C1 | C2/C1 | | NONVOLATILE MEMORY VER NULL |
| C1/C1 | C2/C1 | | NONVOLATILE MEMORY FAS NULL |
| C1/C1 | C2/C1 | | NONVOLATILE MEMORY CHECK SUM |
| DISCRETE | C1/C1 | C2/C1 | |
| DISCRETE | C1/C1 | C2/C1 | |
| DISCRETE | C1/C1 | C2/C1 | |
| SPARE | | | |
| SPARE | | | |
| SPARE | | | |
| C1/C1 | C2/C1 | | ROLL AUTOPILOT CMND |
| SPARE | | | |
| C1/C1 | C2/C1 | | GROUND TEST WORD |
| C1/C1 | C2/C1 | | LINK TEST WORD |
| C1/C1 | C2/C1 | | LINK TEST WORD |
| SPARE | | | |
| C1/C1 | C2/C1 | | YAW AUTOPILOT CMND |
| A/D | C1/C1 | C2/C1 | ROLL TRIM POS |

Figure 4:
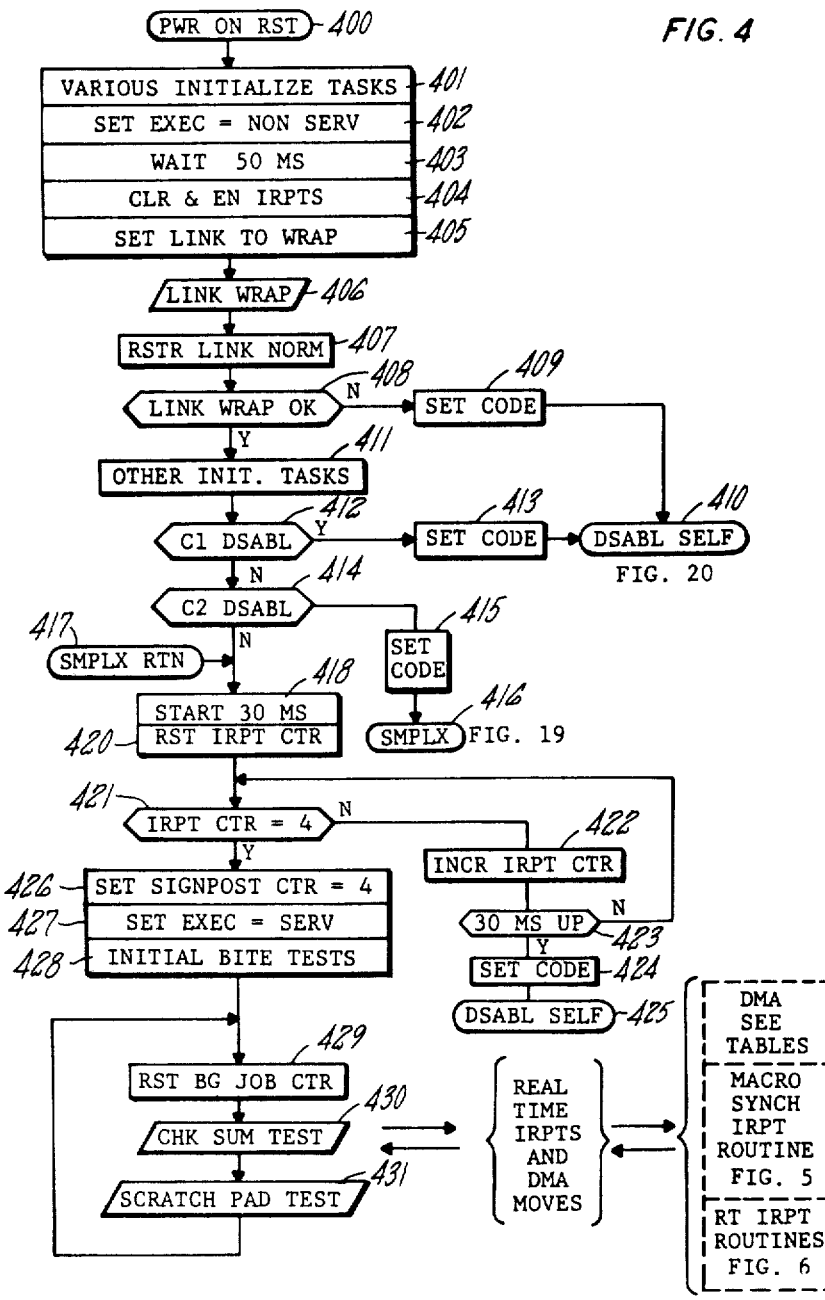
FIG. 4 is a logic flowchart of the initialize and background job programs for the embodiment of FIG. 1.

Referring now to FIG. 4, when the power is interrupted and restored, as is very typical in digital processing systems, the power on reset function will force instruction handling to begin at a program address defining an initialization routine for establishing operating conditions and parameters through program entry 400. In the initializing, contents of non-volatile memory, which includes indications of the important status of the control system are restored into scratch pad memory so that the system will turn on with the status indicators that were previously established. This is accomplished in step 401, along with various other housekeeping functions, such as zeroing out of scratch pad, enabling fault indicating routines and the like, initializing of various registers and hardware are performed. Step 402 places the executive program into the non-service mode, after which a fifty millisecond wait is provided in step 403 to allow time for the system to warm up and settle down. Then interrupts are cleared and re-enabled in step 404.

Step 405 enables a link wrap test of the type alluded to hereinbefore, by generation of a discrete signal which will transfer the link switches (55, FIG. 1) so that C1 will wrap around on itself during a link wrap test routine 406, after which the data link is returned to its normal inter-computer configuration in step 407. The link wrap routine 406 is not shown in detail herein, but is a simple data move by the DMA from C1/C1 (FIG. 1 through the wrapped link (55) to C1/C2 of whatever it was moving for later comparison by the CPU, in a very well known fashion. In test 408, should the link wrap test fail, a fault code is set in step 409 and the program branches to the disable self routine described hereinafter with respect to FIG. 20, through routine entry point 410.

On the other hand, if the link test does not fail, more initialization may occur as illustrated in step 411. In some system control embodiments, the further initializing indicated in step 411 may include calculation of nulls and other factors to be utilized in translating the readings of various sensors (such as accelerometers in the aircraft control system described herein). Other initializing functions will be apparent to those skilled in the art in dependence upon the particular control system in which the present invention is to be employed.

In test 412, the computer determines whether it has previously been disabled; the purpose of this is to test the driver power supply 93 (FIG. 2) to check for a power failure of any sort; or should the system be shut down in normal operation and then restored (such as for the emergency getaway of an aircraft) without first providing suitable diagnostics and maintenance to cure the problem, the fact that one or the other computer has previously been disabled must be maintained. It follows this routine so as to establish hang-up in a disabled mode as is described more fully with respect to FIG. 20 hereinafter. Thus, in step 413 the fault code for disabling self is set, and the program transfers through point 410. In a similar fashion, if computer 2 is disabled, computer 1 must establish its operation in the simplex mode. For that reason, test 414 determines whether C2 is disabled by comparing against a flag, and if it is, step 415 sets a code to indicate that computer 2 is disabled, and the program is shifted to a routine for establishing operation of computer 1 in the simplex mode, at program transfer point 416.

If neither computer 1 nor computer 2 is disabled, instruction handling continues, to establish operation of computer 1 in a manner with its background program continuously running, except during the five real time interrupts which cause performance of the utility prgorams, each program returning to the interruption point in the background program. The establishment of this operation includes testing the interrupt counter and an interrupt timer. This test is performed in the same fashion during power on reset initialization as described, as well as whenever transferring into the simplex mode of operation, which requires re-initialization, through the simplex routine entry 417. To test the interruption handling features, a thirty millisecond timer is started in step 418, and the interrupt counter is reset in step 420. Then the interrupt counter is tested for its terminal count of 4 in test 421. If it has not yet reached its count of 4, the interrupt counter is incremented in step 422.

Then the determination of whether all of the interrupts can be handled in the prescribed time is made at test 423 by determining whether the thirty millisecond time out has occurred. If it has, a fault code for that is set in step 424, and program handling for establishing disablement of computer 1 is reached by routine entry 425. On the other hand, if the time isn't up, then the interrupt counter is again interrogated in step 421 until such time as it reaches its count of 4, unless the thirty millisecond count times out first.

If it does reach the count of 4 in time, then a signpost counter is set in step 426. Notice that the executive program has been in the non-service mode since it was placed there in step 402, hereinbefore. Assuming all goes well, at step 427 the executive is returned to the service mode, and then some initial built-in test equipment tests are performed in step 428. Although referred to as a step, it is most likely that the initial BITE test indicated in step 428 may involve routines, which are, however, not described elsewhere herein.

Next, the background job counter is reset to indicate start of the background job; more on this with respect to FIG. 5, hereinafter. The background job then performs a check sum test routine, and a scratch pad test routine, repetitively, in a loop, throughout operation of the computer, in other than the disabled mode. Each of these background loops are, however, interrupted about 100 times by the real time interrupts to perform utility program service, some examples of which are described hereinafter. Of the five interrupts disclosed as exemplary herein, each of them will perform utility processing, and then return to the background job as depicted in step 429 and routines 430 and 431. During the real time interrupts and the background job, the DMA is busy moving data from the digital multiplexer 45 (including the A/D and discretes) into C1/C1 and C2/C1, or from C1/C1 to C2/C1, in synchronism with the real time interrupts.

Figure 15:
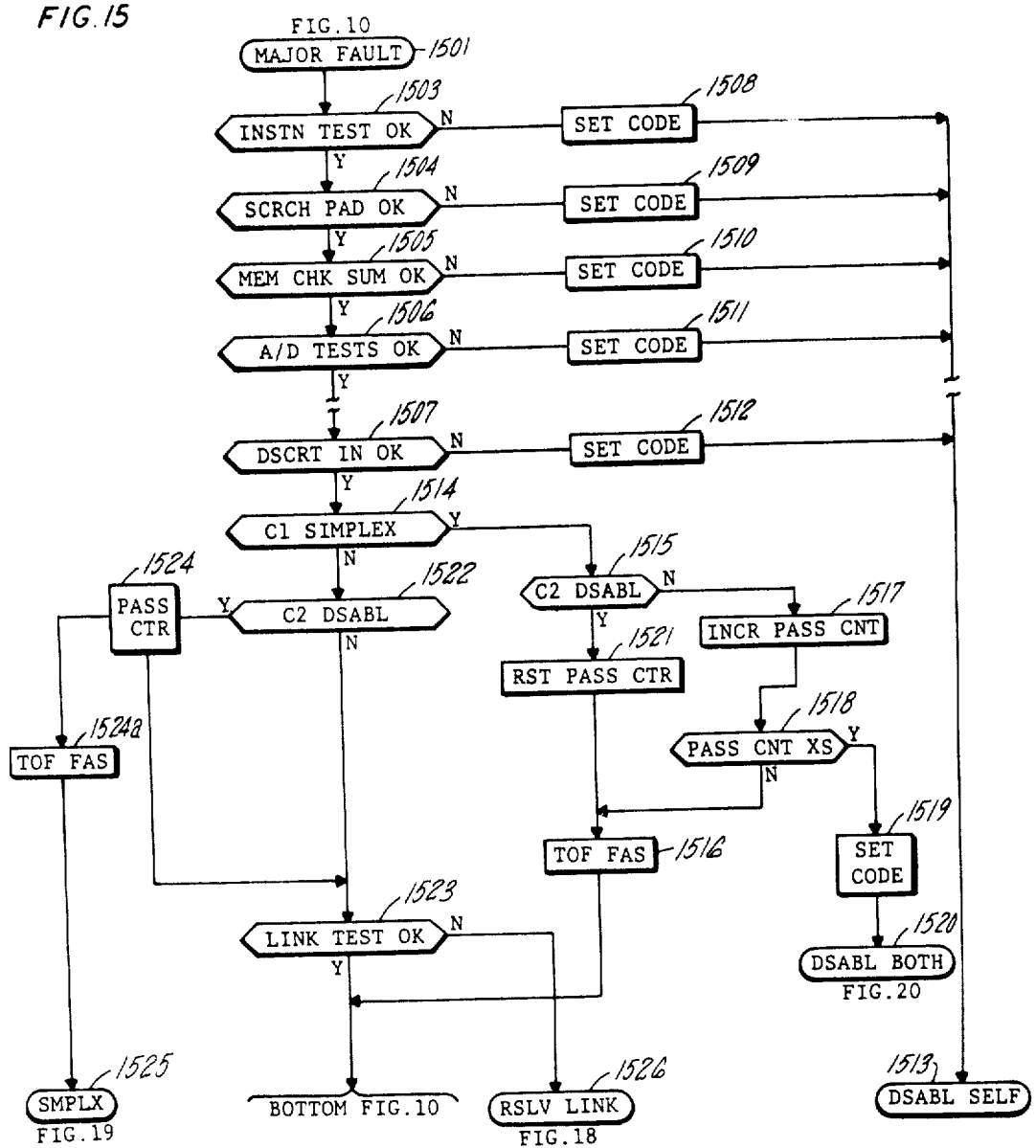
FIG. 15 is a logic flowchart of the major fault subroutine of the program of FIG. 10.

The bit sum check, of the critical portions of fixed memory 35 and scratch pad 36, performed repetitively by the background program as illustrated at the bottom of FIG. 4, provides a significant amount of storage testing of computer 1; together with the instruction test (hereinafter), the likelihood at any point in time is that computer 1 probably is operating properly, unless one of these tests indicate a failure, which failure is picked up as described more fully with respect to FIG. 15, hereinafter. And, these tests are performed utilizing computer time in between the computer time devoted to the utility programs which provide system control with the extremely safe, reliable operation as described herein, and maximum CPU utilization.

Figure 5:
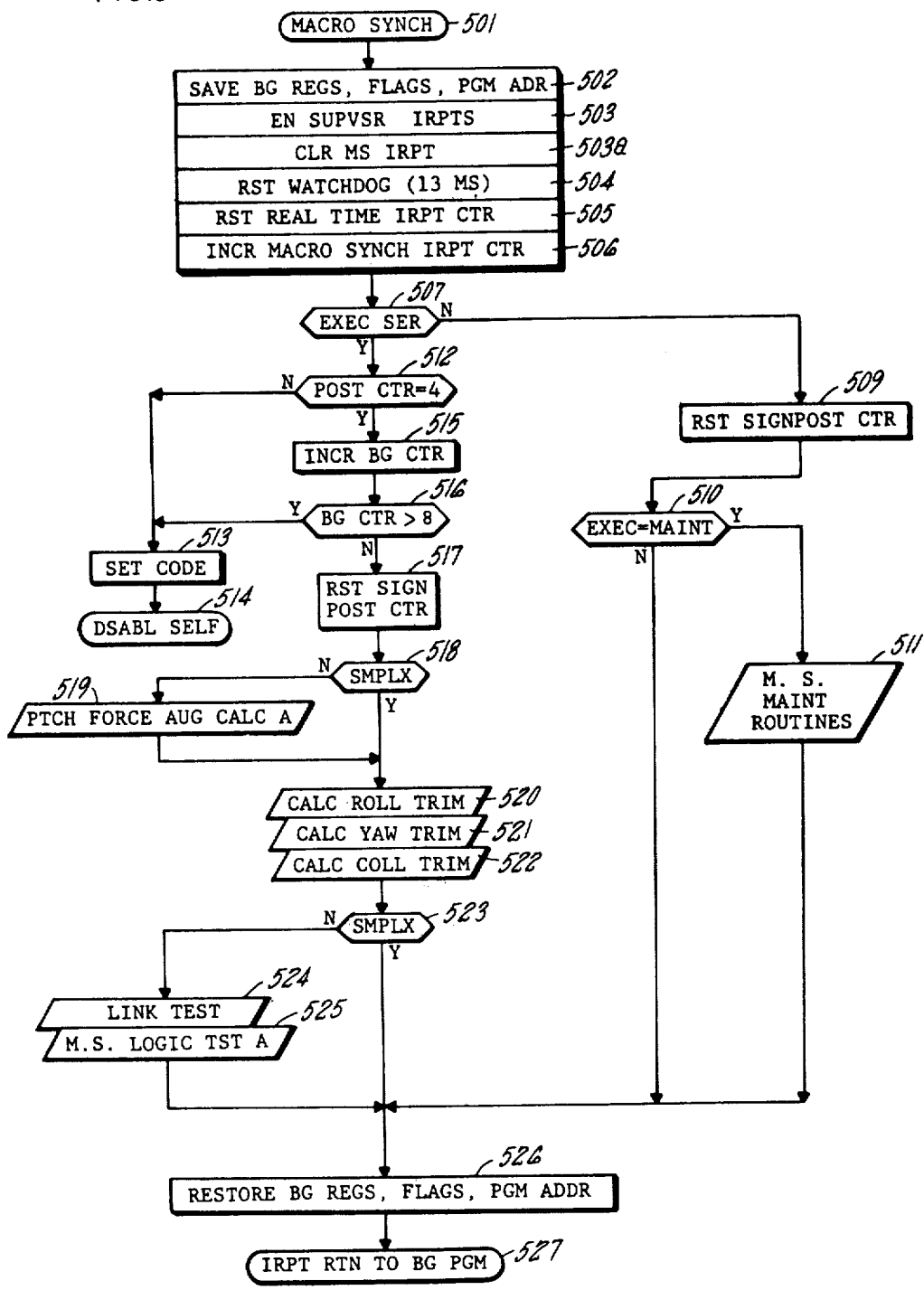
FIG. 5 is a logic flowchart of the machrosynch interrupt program for the embodiment of FIG. 1.

The first interrupt in the sequence of interrupt priorities is called MACRO SYNCH; with the program for the MACRO SYNCH interrupt is described with respect to FIG. 5, reached through program entry 501. The interrupted program status is recorded in the usual fashion in step 502. Supervisory interrupts are enabled in step 503; these are interrupts which have a higher priority than the utility program interrupts, such as the losing of power. Other critical factors could also cause supervisory interrupts in any implementation of the invention.

The watchdog timer 56 (FIG. 1) is reset at regular intervals or after about 13 MS it sets up an alarm indication (57, FIG. 1) of the fact that something is hung up in the program, in a well known fashion; this is reset every 12.5 MS in step 504. In step 505, the interrupt counter, which is referred to hereinbefore with respect to FIG. 4, is reset so as to cause it to indicate that the next following interrupt will be interrupt No. 1, a factor which allows the interrupt counter to lag the signpost counter in a manner described hereinafter, and also to accommodate five interrupts while using a four-count interrupt counter. Next, step 506 indicates that the MACRO SYNCH interrupt counter is to be incremented, to keep track of how many MACRO SYNCHs have occurred. This is simply a long-delay timer of 12.5 MS which is used to create long waits, and the like. An example is the 50 MS wait in the disabled mode, which can be effected by four counts of the MACRO SYNCH counter.

In test 507, the status, of whether the executive program is serving interrupts or not, is tested. If not, the signpost counter, which in this embodiment is a 4-bit counter, is reset in step 509. Then the executive is interrogated to see if it is in a maintenance mode in test 510, so that certain maintenance routines 511 may be performed. This status of the executive program is controlled through switches or the like by operator intervention. Returning now to test 507 near the top of FIG. 5, if the executive program is in a service mode, the signpost counter is interrogated in test 512. Since the last interrupt should have been real time interrupt No. 4, and this counter is preset to four during initialization, the signpost counter should be set at 4. If it is not, then a fault code is set in step 513, and the program branches to a routine for disabling itself through program transfer point 514.

On the other hand, if test 512 indicates that the signpost counter is set properly, then the background counter is incremented in step 515 and is interrogated in step 516. If the background counter exceeds 21, it has been in the same loop for more than 20 MACRO SYNCHs. This means the BG is taking too long, and is probably hung-up, and not providing the desired testing; so, step 513 sets a fault code and the program transfers through the program transfer 514 to disable C1. But if the background counter has not exceeded 21, the signpost counter is reset in step 517, which causes it to be set to 1 for interrogation in the real time interrupt entry rountine, as described hereinafter with respect to FIG. 6.

Figure 18:
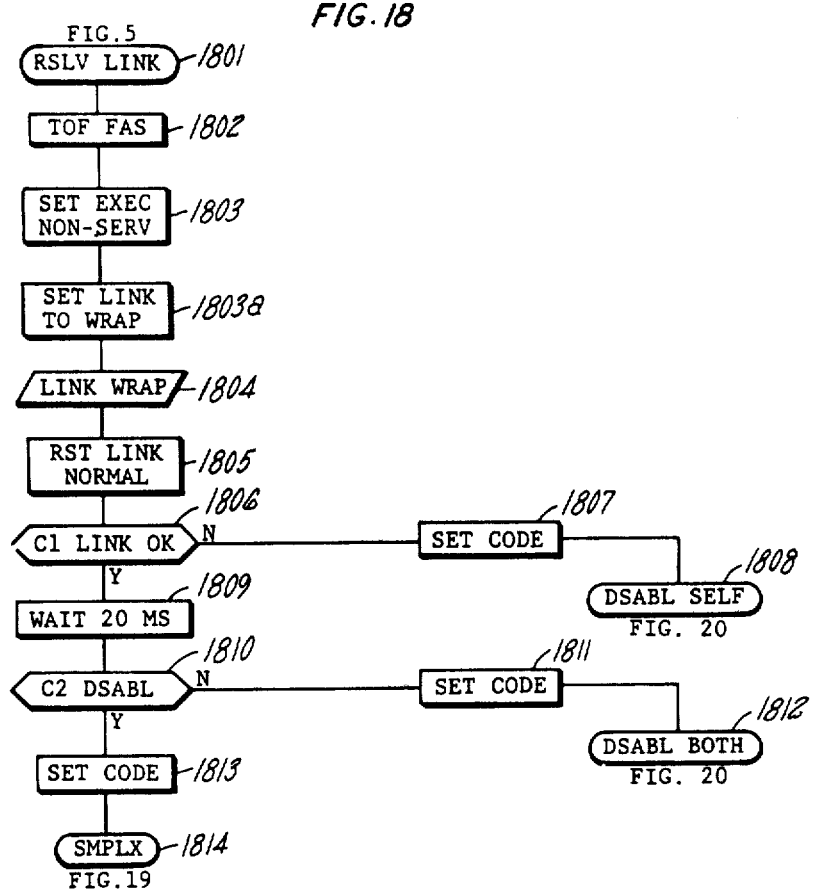
FIG. 18 is a simplified logic flowchart of a resolve link subroutine used in the program of the embodiment of FIG. 1.

The status of this computer's operation (that is whether both computers are running in a duplex mode or whether this computer is running by itself in a simplex mode) is interrogated in test 518. If the computer is not in the simplex mode, it is therefore in the duplex mode and it can therefore perform those control functions which are allowed to be performed only in the duplex mode. Some of these functions are of extremely grave consequences which are allowed to be controlled only by two properly operating computers, and are not utilized in the event that one of the computers has failed. In the aircraft control system described herein by way of example, such a program, as indicated by routine 519, is the calculation of pitch force augmentation system parameters. Then, other routines may be performed which are not too dangerous but are most important, and which may be run in simplex mode by a single computer. Examples, in the aircraft control system described herein, include calculation of roll trim (routine 520), calculation of yaw trim (routine 521), and calculation of collective trim (routine 522). This is an example of one type of the fail-operational features of the invention. Then, the status is again interrogated in test 523, and if the computers are both operating so that computer 1 is not in a simplex mode, a link test rountine 524 is performed; this link test is different than the wrap around link test (405-407, FIG. 4) since it provides for the DMA of each computer to send to the other computer (C1/C1 to C2/C1) data of a known pattern so the other computer can determine whether it sent it correctly or not, including both true and complement patterns, in a well known fashion. The link test is interrogated during the 4th real time interrupt, and if it indicates there is a problem with the link, the computers will be further tested as is described more fully with respect to FIGS. 15 and 18, hereinafter. In addition to the link test, the first, low-half of each 12.5 MS MACRO SYNCH square wave is verified as being in the low state in a macro synch logic routine 525.

This signifies the end of the MACRO SYNCH interrupt program, regardless of whether the computers are in duplex or simplex mode, and regardless of whether this computer is in a maintenance or an executive service mode. Thereafter, in step 526, the return from interruption handling is made possible by restoring all of the background program parameters, and the system returns to the background program automatically through interrupt return point 527.

After completing the macro synch interrupt routine described with respect to FIG. 5, by means of interrupt return, the background program is resumed, and it will pick up wherever it left off, assynchronously with respect to the real time interrupts, and assynchronously with respect to the other computer. The only criterium is that the overall cycle time planning must be such as to accommodate as much BG self test as felt necessary. The present embodiment provides approximately 12½ MS between MACRO SYNCHs; only about half of that time is utilized for the interrupt, service routines, the remaining time being available for the checksum test and scratch pad test. The background program may require 100 MS to run, but since it is continuously interrupted, it may require 200 MS to complete.

As the background job is progressing, eventually a second real time interrupt will occur (see FIG. 3). This, and the next three, are referred to herein as "RT IRPT" and are anonymous insofar as interrupt handling is concerned, but are resolved into different programs by the real time interrupt handling (other than MACRO SYNCH) described in FIG. 6. All of the four real time interrupts are entered through the program entry 601, following which the particulars relating to the background program are saved in step 602. The supervisory interrupts (as described with respect to FIG. 5) are enabled in step 603, and the real time interrupt request is reset in step 604; this permits any additional RT IRPT to occur, if the real time clock is faulty, so such can be checked against the signpost and BG counters and the computer can be disabled. The real time interrupt counter is then incremented in step 605, to indicate that this will be RT 1.

If the executive program is in neither the run nor maintenance mode as determined in steps 606 and 607, the background program particulars are restored in step 608, the signpost counter is incremented in step 609, and instruction handling will branch back to the background program through interrupt return point 610. This short loop will be used during hang-up in the disabled mode, described hereinafter. But if it is determined in step 607 that the executive is in the maintenance mode, real time maintenance routines 607a will be performed. This could be diagnostics or the like and is called for by intervention of personnel. These routines are not described elsewhere herein and are not important in the precepts of the invention.

IF the executive program is in the run mode as determined in step 606, then the signpost counter is compared with the real time interrupt counter in test 611 to see if the programs are properly tracking. That is, the real time interrupt counter should say that we are entering into the one of the four real time interrupt programs that the signpost counter says we should be on. If not, then a fault code is set in step 612 and the disable self routine is reached through routine entry point 612a. On the other hand, if the programming is on track, then the desired real time interrupt program is reached by first adding the real time interrupt counter to the real time program base address in step 613 and then branching to the resulting real time interrupt address through program entry point 614. Thus one of four real time interrupt programs, numbered designated RT 1 through RT 4, will be reached and performed as described with respect to FIGS. 7 through 10 hereinafter. At the end of each of these programs, they return to the real time interrupt program of FIG. 6 through a program return point 616, to cause incrementing of the signpost counter in step 608 and return to the background program through the interrupt return 610, as described hereinbefore.

As before described, there are general tests being run in the background program in between service programs, which help to delineate the health of the system. In addition, what is referred to herein as critical testing is also performed during the utility programs. One example is described generally within real time interrupt 1 as shown in FIG. 7. Therein the program is entered through program entry point 701, and test 702 determines whether or not the system is in the simplex mode. If it is, this means computer 1 is going it alone, and all full authority operations are prohibited since there is no way to check computer 1 to determine that what it is doing is absolutely safe in the control of the aircraft. In the event that it is in simplex mode, it will therefore skip step 703 which provides the output of the pitch force augmentation which has been skipped during MACRO SYNCH interrupt as described with respect to routine 519 in FIG. 5 hereinbefore. However, certain less critical but highly desirable control functions can be performed, even if the control system is operating in the simplex mode, so that steps 704–706 can check the accuracy of and send out the trim calculations made in steps 520–522 of the MACRO SYNCH program, as described with respect to FIG. 5 hereinbefore. Then, in subroutine 707, roll inner loop calculations are performed, as are described more fully with respect to FIG. 16 hereinafter. This is one of the routines that is illustrative of what is referred to herein as critical self test, in which tests are performed in direct association with calculations which are related thereto, and which can determine proper system health with respect thereto. In step 708 the yaw inner loop calculation is performed, and in step 709 processing of fault and status codes for display is performed; since this is routine and varies considerably in dependence upon a particular system being used and the features desired therefor, it is not described elsewhere herein. Then the first real time interrupt returns through program return 710 to the real time program of FIG. 6, and ultimately to the BG program.

In FIG. 8, real time interrupt program 2 is reached through program entry 801; the first subroutine 802 in this program is to check the accuracy of and then send out the results obtained in performing the roll inner loop calculation of subroutine 701 in real time program 1 (FIG. 7). This illustrates that calculations made during one real time interrupt are tested and outputed in the next real time interrupt, all of the background program time between interrupts being available for cross talk between the two computers so that their two results can be checked without holding up the system. This is one of the aspects of the present invention, in that it employs suitable time delay while proceeding with background health testing and utility processing so as to permit checking of real time, on-line data for immediate use, and with maximum CPU utilization.

After the roll inner loop output subroutine, the yaw inner loop calculated in step 708 (FIG. 7) is outputed in subroutine 803 and a pitch inner loop calculation is performed in subroutine 804. Next, if test 805 determines that the computer is not running in the simplex mode, a collective pitch inner loop calculation is performed by subroutine 806; otherwise, the collective pitch inner loop calculation is by-passed because this is used for altitude hold, an autopilot function which is not necessary to aircraft control. This type of function which is not performed in the simplex mode in order to provide a lot more BG testing per MACRO SYNCH, so that the confidence of single-computer control over more essential functions (such as stick trim) may be maintained. The BG program may only require six MACRO SYNCHs in simplex mode, increasing its contribution to safety by about 25%. Similar type operations in other utilizations of a control system within the present invention may similarly be by-passed as should be apparent to those skilled in the art. Then, subroutine 809 checks the power supplies multiplexers and the like through the A/D converter 43 (FIG. 1). This is an ordinary routine of a well known type which simply reads in voltages for comparison with norms, reads test voltages from dummy input devices to test the A/D, and so forth. Then, the system reverts through program return point 810 to the real time interrupt return steps illustrated in FIG. 6, and then to the BG program.

Referring now to FIG. 9, real time interrupt program No. 3 is reached through program entry 901. If test 902 determines that computer No. 1 is not operating in the simplex mode, then the collective inner loop calculated in subroutine 806 (FIG. 8) is compared and outputed in subroutine 903 and, a second pitch force augmentation calculation is performed in subroutine 904. If computer 1 is operating in the simplex mode, these subroutines are by-passed. Next, test 905 determines if the autopilot subroutine counter is zero. If it is, this means that the counter has advanced modulo 4 (as described with respect to FIG. 10 hereinafter), and subroutines that need doing only once in four MACRO SYNCHs are performed. Therefore, if the counter is at zero, pitch bias is calculated in subroutine 906 and the discrete input paths to computer 1 are tested in a routine fashion in subroutine 907.

Thereafter an instruction test is performed in subroutine 908; this is an exercise program which utilizes a significant portion of the facilities of the computer and the scratch pad to perform various arithmetic and logic operations. Although an instruction test cannot test all of the scratch pad and fixed memory, tests relating thereto are repetitively being performed by the background job program. Between the instruction test 908 and the background program test functions, nearly all of the CPU is self tested. Therefore the likelihood of a CPU failure is extremely small unless detected by the background or by the instruction test subroutine 908.

Following the instruction test subroutine, the built-in test codes indicative of various status and fault situations are stored into non-volatile memory where it will be retained even in the case of power being shut off or power failure. Then, the program will advance through the real time interrupt routine as illustrated in FIG. 6, through program return point 910, and back to the background job (FIG. 4).

Referring now to FIG. 10, the fourth real time interrupt is reached through program entry 1001 and if test 1002 determines that computer 1 is not operating in a simplex mode, it will test and output, in subroutine 1003, the pitch force augmentation calculation (B) which was performed in subroutine 904 (FIG. 9). Otherwise, test 1002 causes by-passing of this step when in the simplex mode.

Then, subroutine 1004 compares and outputs the pitch bias calculated in subroutine 906 (FIG. 9). In step 1005 a servo counter is set to four, to keep track of four successive tests of four servos, hereinafter. Also, step 1006 sets a counter relating to the four FAS/trim servo valves to an initial count of four, for a similar purpose. Then the feedback test address is set to the address for testing servos in step 1007 and the feedback subroutine 1008 is performed on the servo designated by the feedback address. The feedback test routine 1008, as is described more fully with respect to the output circuitry herein, compares the actual servo valve currents (by voltage on line 48a, FIG. 2, for instance) employed to control the aircraft (in response to the commands of the control system of the present invention) with the commands given thereto, to see if there is proper response in the entire output system. This is one of the principal tests of the present invention which allows completely safe and accurate degraded operation, or the fail-safe shutdown of faulty portions of the system if necessary.

After each feedback test routine 1008, the servo counter is decremented in step 1009 and the feedback test address is incremented in step 1010. When test 1011 determines that all of the desired feedback tests have been completed by an indication that the servo counter has been decremented back to zero, further feedback testing of servos is terminated, and the feedback test address is set to the base address for feedback testing of the FAS/trim servo valves in step 1012. Then the feedback test is again performed by subroutine 1013, while decrementing test address in step 1015. When test 1016 indicates that all of the FAS/trim output valves have been feedback tested, the program advances to set the feedback test address for testing of the pitch bias actuator in step 1017, and the feedback test is again performed by subroutine 1018. But since there is only one of these, there is no iterative testing required as described hereinbefore.

Then a MACRO SYNCH status test B is performed in subroutine 1019; this test simply checks to see if the 12.5 MS MACRO SYNCH square wave is now in its second half, indicated by a high level (the low level is verified in subroutine 525). Then, major fault logic is performed in subroutine 1020, as is described in detail hereinafter with respect to FIG. 11.

Successful completion of the major fault logic subroutine will cause the autopilot counter to be incremented modulo 4 in step 1021, followed by a branch to an autopilot subroutine address as indexed by the autopilot counter, through program entry point 1022. This will cause the program to perform one of four autopilot programs that are designated 0 through 3 as described more fully with respect to FIGS. 11–14 hereinafter. This permits performance of each of the autopilot programs only once for each four MACRO SYNCHs, a different one being performed in each successive 4th real time interrupt. Thereby, logic functions that are not too critical and shouldn't take up too much program time, will not unduly delay the real time response capability of a sophisticated, fail-safe and fail-operational control system of the type disclosed herein.

Figure 11:
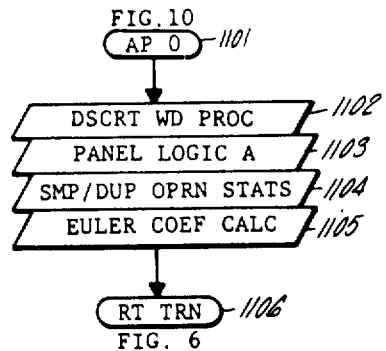
FIGS. 11-14 are logic flowcharts of alternative autopilot program portions of the fourth real time interrupt program for the embodiment of FIG. 1.

Referring now to FIG. 11, the lowest-ordered automatic pilot subroutine is reached, in every fourth one of the fourth real time interrupts, through program entry point 1101. In this program, subroutine 1102 performs discrete word processing. The DMA's will have entered discrete words (e.g. from 50 and 51, FIG. 1) into C1/C1 and C2/C1, and into C2/C2 and C2/C1, respectively, from time to time. Then each computer compares its discrete inputs with that of the other (C1/C1 with C1/C2; C2/C2 with C2/C1) to see if they agree. If not, several passes are permitted before a code is set indicating fault. If they agree, each computer transfers the discretes for its use (from C1/C1 to scratch pad 1, and from C2/C2 to scratch pad 2, respectively). This is not described further herein. In subroutine 1103, one set of panel logic is performed which provides updated status to an operator controlled panel, such as the cockpit displays in an aircraft in the exemplary system herein. These comprise simply outputting (on CPU output bus 61) to the control panel, where the status words of the two computers are OR'd and converted for display. In subroutine 1104, a number of status checks relating to both simplex and duplex operation is performed. These are status tests and checks such as determining if the roll trim system may be engaged based upon other discrete indicators such as hydraulic servo status, computer test fail/operational status, input sensor fail/operational status and the like. Further examples are described with respect to FIGS. 16 and 21, hereinafter. In subroutine 1105, Euler coefficients (sine and cosines of the vertical gyro outputs) are calculated for use in converting earth coordinate data derived from the vertical gyro into aircraft coordinate data, whereby the vertical gyro can be used as a source of current information for checking one set only of rate gyro inputs in the case where the rate gyros of either computer have failed, as is described more fully with respect to the roll rate inner loop calculations of FIG. 15, hereinafter. Then, this program goes back to the real time interrupt routine steps of FIG. 6 (and thence to the BG) by means of program exit point 1106.

Figure 12:
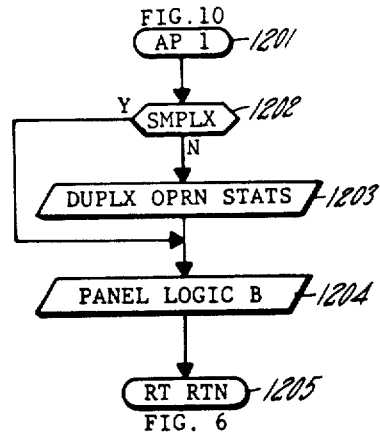

In FIG. 12, the second of the autopilot programs, which is performed only once for each fourth one of the fourth real time interrupt program, is entered at entry point 1201. If test 1202 determines that both computers are still running, logic similar to that described with respect to subroutine 1104, but needed only in duplex mode, is performed in subroutine 1203. This logic is not performed when in the simplex mode. As example of this type of testing is engagement of the roll autopilot function. Then, additional panel logic functions to provide display information (like those of subroutine 1103) are performed in subroutine 1204, and the program exits to the real time interrupt routine steps of FIG. 6 through program return point 1205.

Figure 13:
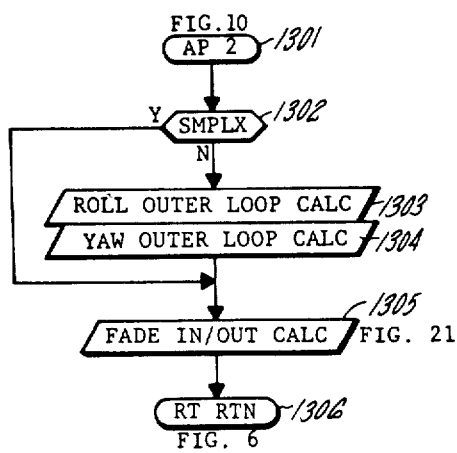

In FIG. 13, the third autopilot subprogram, which is performed only once for each fourth one of the fourth real time interrupt program, is reached through program entry point 1301. If step 1302 determines that both computers are operating in the duplex mode, calculations for roll outer loop and yaw outer loop are performed in subroutines 1303 and 1304. These are functions which fly the aircraft hands off under autopilot control, and are deemed not to be as essential as system integrity, so they are performed only if both computers are operating and checking each other; but in simplex mode, they are dropped in favor of more CPU time for BG testing. The fade in and fade out calculations of subroutine 1305 are then performed, as described more fully with respect to FIGS. 21 and 16. Then the program is returned through exit point 1306, so as to reach the background program through FIG. 6.

Figure 14:
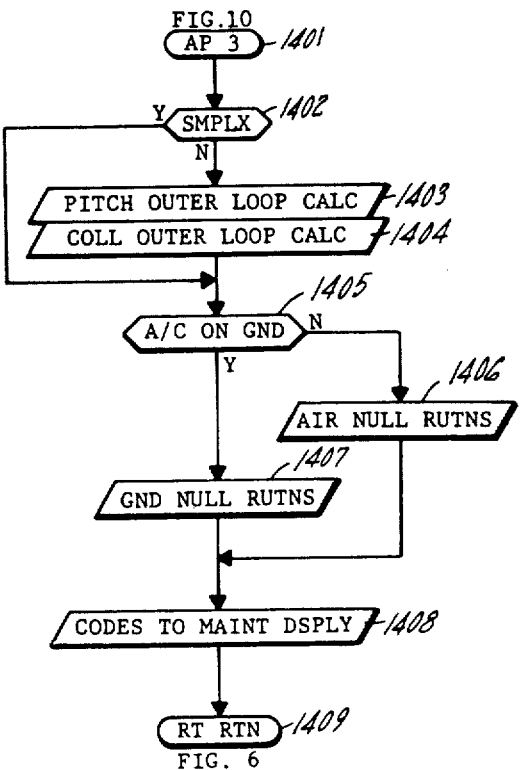

In FIG. 14, the last of the four interleaves autopilot programs, AP 3, is reached through program entry point 1401. If both computers are operating and checking each other, pitch outer loop and collective outer loop calculations are made in subroutines 1403 and 1404; but if this computer is operating in a simplex mode, these are dropped to allow more self-checking in the BG program, as described hereinbefore. Test 1405 determines if the aircraft is on the ground; if not, airborne null subroutines 1406 may be performed; these may, for instance, permit readjusting the nulls of various accelerometers and the like during conditions of absolutely smooth, non-accelerative flight, and involve reading the outputs of the related sensors and providing null offsets to storage through simple data moves and arithmetic. If on the other hand the aircraft is on the ground as indicated by test 1405, then a similar subroutine 1407 may provide for nulling the instruments to the aircraft being fixed to earth axis. In either event, in subroutine 1408, codes are transferred to a maintenance display register (60, FIG. 1) for access by maintenance personnel, and then the program returns to the interrupt return to BG sequences of FIG. 6, through program return point 1409.

There has been described with respect to FIGS. 3 through 14, on a very general level, the entire program pattern for the dual computer aircraft control system which is disclosed in FIGS. 1 and 2 as an example of the fail-safe, multi-computer, digital control system of the present invention. Certain of the subroutines are not described further, since they are irrelevant to the present invention. And, it should be borne in mind, that any form of vehicle, process or other critical control system may employ the present invention and utilize the detailed software required therefor, including the testing of inputs, outputs, data links, as well as memory and CPU, etc., as described herein, to provide fail-operational, fail-safe control.

As further examples of the critical testing and the like which is performed herein, additional subroutines are described. In FIG. 15 the major fault logic subroutine 1020, referred to near the bottom of FIG. 10, is reached through program entry point 1501. Then, in tests 1503 through 1507, major, fault-indicating subroutine results are tested to see if there has been a major fault in the system; these include the instruction tests (908), the scratch pad test (431), the memory check sum test (430), the A/D test (809) and a discrete input word test of fixed and toggled test bits accompanying each input discrete word (not described elsewhere herein). In the event that any of these indicators show a failure of such test, a corresponding code is set in a related step 1508-1512, and the program will branch to the disable self subroutine through program transfer point 1513.

In test 1514, computer 1 determines whether it is operating alone in a simplex mode, and if it is, it determines in test 1515 whether or not it shows the status of computer 2 as disabled. If it does, it turns off the force augmentation system in step 1516, because force augmentation is too critical to permit when operating in a simplex mode. It then returns to the program of FIG. 10. But if test 1515 shows that computer 1 still indicates computer 2 as not being disabled, then obviously something is wrong, because computer 1 cannot be operating simplex unless computer 2 is disabled. This is an indication of one computer not taking the other computer's word for anything (except for a few of the status words that computer 2 will supply to computer 1). And if the status words indicate any doubt as to who is right, then both computers are disabled to avoid any catastrophic results which might occur if the wrong computer took command or if the two computers were fighting each other when one of them was not operating properly. Thus, failure of test 1515 will increment a pass counter in step 1517 and the content of the pass counter is tested to see if it has exceeded a desirable small count such as 2 or 3 in test 1518. If it has, that means that this point in the program has been passed several times with a failure of test 1515, and the two computers apparently don't agree as to whether only one or both of them is operating, so a code is set in step 1519 and the subroutine to disable both is reached through program entry point 1520. Until the pass count is exceeded in step 1518, however, computer 1 will not necessarily take the radical step of disabling both computers, but will simply avoid performing the most critical of functions (force augmentation) for a few passes through the real time interrupts, by turning off the force augmentation system by means of program step 1516. This is the normal TOF of FAS. This procedure permits computer 2 to update its disabled status if it becomes disabled. Normally, as is described more fully hereinafter, however, once either computer is disabled it remains disabled, and the other is simplex or disabled, until some form of operator reset is performed thereon. But, if computer 1 has determined that computer 2 should be disabled because of the fact that computer 2 has sent some kind of a failure test to it, but computer 1 still has not registered a disable indicator for computer 2, then it cannot assume that it is all right and that it can continue in simplex mode becuase, indeed, it may not be all right; it may, for instance, not be operating in the simplex mode, and if it proceeded to make calculations as if it were, these would conflict with those being made by computer 2; on the other hand, computer 2 may not be disabled because it may somehow have failed to disable itself when it should; or, it may be disabled but not providing a proper indication thereof to computer 1, which could cause computer 1 to operate in a simplex mode erroneously. In any event, whenever computer 1 thinks it is in the simplex mode, computer 2 must become disabled shortly, or both computers will fail; but if computer 2 does disable itself after a few passes through the real time interrupts, computer 1 may reset the pass counter in step 1521 and proceed in the simplex mode, thereby providing fail-operational control over the more, essential functions which are allowed to be performed by the control system simplex mode.

After testing the simplex/disabled statuses of the computers in test 1514, if computer 1 does not designate itself as being in the simplex mode, it will then test to see whether computer 2 is disabled anyway. This covers the situation where computer 1 thinks it has a partner but it may not. In a fashion similar to that described hereinbefore, if test 1522 shows that computer 2 is disabled, something is wrong because test 1514 indicates that computer 1 is operating in the duplex mode with computer 2 as a partner. But this status might be only momentarily wrong and may correct itself during the period of time elapsing between this particular fourth real time interrupt and the next one in which this test is performed. For that reason, a pass counter 1523 is employed to allow a few machrosynch interrupt periods to transpire before acting on the discrepancy between test 1514 and test 1522. In FIG. 15, the pass counter 1524 is illustrated in a shorthand form which is used hereinafter, but includes the incrementing, the testing of the count, and the resetting described with respect to items 1517, 1518 and 1521 hereinbefore. Once the pass count is exceeded, then the force augmentation system is turned off by means of the step 1524 and then simplex operation is established for computer 1 by means of a simplex routine reached through program transfer point 1525, which is described more fully with respect to FIG. 19 hereinafter.

If computer 2 is not indicated as disabled by test 1522, the program will interrogate the results of the link test subroutine 524 performed in FIG. 5, in test 1523. If the normal link test has failed, then a resolve link subroutine is reached through program entry point 1526, as is described more fully hereinafter with respect to FIG. 18. But if the inter-computer link test of FIG. 5 was okay, then the fourth real time interrupt routine continues at step 1021 of FIG. 10.

Figure 16:
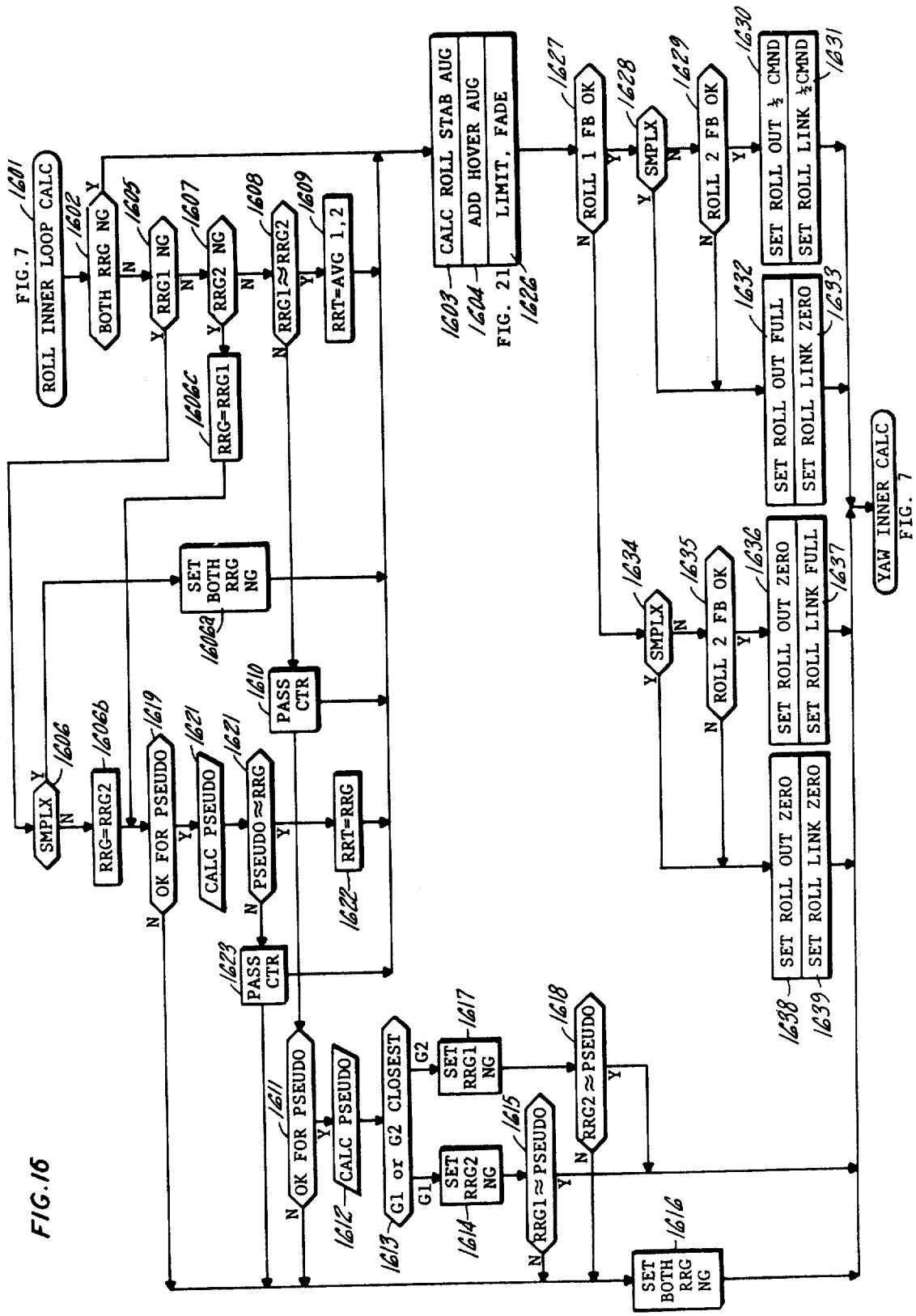
FIG. 16 is a simplified logic flowchart of the roll inner loop calculation subroutine of the program of FIG. 7.

As described briefly hereinbefore with respect to FIG. 7, the roll inner loop calculation subroutine 707 is illustrative of utility or service routines in which what is referred to herein as critical self testing takes place. Specifically, the roll inner loop calculation subroutine of FIG. 16 is illustrative of testing of inputs to see if the transducers or sensors feeding computer 1 agree with the inputs provided by the sensors or transducers feeding computer 2. If they are reasonably close to each other, then the average of the two is used for an updated value for recalculating a control parameter, both computers therefore using precisely the same average value for their respective calculations. But if the two inputs do not agree, then in the case of the roll rate gyros, a comparison will be made against a pseudo roll rate calculated by means of the earth-coordinate, vertical gyro roll axis, differentiated in time so as to provide a pseudo roll rate, and converted to aircraft coordinates with Euler coefficients (FIG. 11). If one or the other of the roll rate gyros agrees with the pseudo roll rate within a reasonable amount, then that roll rate gyro is used for calculations in both computer 1 and computer 2, so that no degradation of performance results, and safety is assured because the selected roll rate gyro is being checked against the vertical gyro to be sure it is still functioning properly. But if, finally, neither the roll rate gyro of of computer 1 nor that of computer 2 agrees with the vertical gyro, regardless of whether this is the fault of the roll rate gyro or the vertical gyro, then the roll rate gyro function is no longer performed because it has nothing to check against. This is a specific example of an important aspect of the present invention: duplex operation which is fail-operational for a single failure and fail-safe for a double failure.

Referring specifically now to FIG. 16, the roll inner loop calculation subroutine is reached through program entry 1601. Test 1602 determines if both roll rate gyros have previously been identified as no good, and if so passes immediately to step 1603 which causes the roll rate stability augmentation calculation to be performed using the last roll rate value (RRT), without updating in this iteration. The reason for this is that the hover augmentation which is added thereto in step 1604 may be updated in this iteration, thereby providing a more accurate output, and fade-out is performed.

In step 1605, if roll rate gyro 1 is no good, and if computer 1 is in the simplex mode as indicated in test 1606, both roll rate gyros are set no good in step 1606a and then the program passes to step 1603, as hereinbefore. But if computer 1 is not in simplex mode, it will use the value of roll rate gyro 2, by setting RRG equal to RRG2 in step 1606b for comparison with the pseudo rate, as described hereinafter.

In step 1605, if roll rate gyro 1 is o.k., then step 1607 will see if roll rate gyro 2 is o.k., and if so the two roll rate gyros are compared in test 1608. If they are within tolerance of each other, then a new roll rate value (RRT) is provided as the average of the output of roll rate gyro 1 and roll rate gyro 2, and an average null is included in this calculation, in step 1609. But if test 1608 fails, then a pass counter 1610 is incremented, and until the pass counter is exceeded, this and successive iterations will utilize the previously calculated value of RRT in steps 1603 et seq. However, once the pass counter has exceeded its count, test 1611 will determine if it is all right to do a pseudo roll rate calculation utilizing the pitch and roll axes of the vertical gyro, the yaw axis of the directional gyro, and the Euler coefficients which have previously been prepared in subroutine 1105. If it is possible, then subroutine 1612 will calculate a pseudo roll rate and test 1613 will determine which roll rate gyro is closest to the pseudo rate. If roll rate gyro 1 is closest to the pseudo rate, step 1614 will set roll rate gyro 2 as no good, and test 1615 will determine if roll rate gyro 1 is within tolerance of the pseudo roll rate. If not, both roll rate gyros will be set as no good in step 1616 and the program will pass through without performing any calculations and without resetting any of the outputs from this calculation (such settings being described hereinafter). On the other hand, if test 1615 shows that roll rate gyro 1 is within tolerance of the pseudo rate, then the program will pass out without performing any functions. The reason for this is that several fault codes, as well as the status of the roll rate gyros being good or no good, must be set during this subroutine, and setting of codes consumes too much time to leave sufficient time for the calculation. Therefore, the outputs at the bottom of FIG. 16 are left alone in such a case in this one iteration.

If test 1613 shows roll rate gyro 2 to be closest to the pseudo rate, then step 1617 will set roll rate gyro 1 as no good, and roll rate gyro 2 is compared for tolerance with the pseudo rate in test 1618. If it fails, both gyros are set as no good in step 1616, as before, and in either event the program passes out without doing calculations or updating the outputs.

If in test 1607 roll rate gyro 2 is determined to be no good, RRG is set to RRG1. Then if test 1619 shows that it is not possible to calculate a pseudo rate, this factor is indicated by setting both roll rate gyros to no good in step 1616, and passing through the program without any calculation. If test 1619 shows that a pseudo rate is possible, it is calculated in subroutine 1620 and then compared in test 1621 with RRG. If they are within tolerance of each other, then in step 1622 the new roll rate value (RRT) is taken as RRG, which could be either RRG1 or RRG2, and the program passes to the calculations of steps 1603 et seq.

If the pseudo rate is not within tolerance of roll rate gyro 1 in step 1621, then a pass counter 1623 is incremented and the program jumps to the calculations of step 1603 et seq, using the last value of RRT for the calculation. When the pass counter has been exceeded, however, both gyros are indicated no good in step 1616 and the system will pass out without any calculations or updating of the outputs, as described hereinbefore.

Assuming that step 1603 is reached, calculations are made therein and, in step 1604 limits may be applied thereto, and in step 1626, results may be faded in when first establishing roll rate control, or faded out when roll rate is being turned off due to one of the pseudo or roll rate gyro failures described hereinbefore with respect to FIG. 16, or because the related control system has been turned off by an operator.

Figure 17:
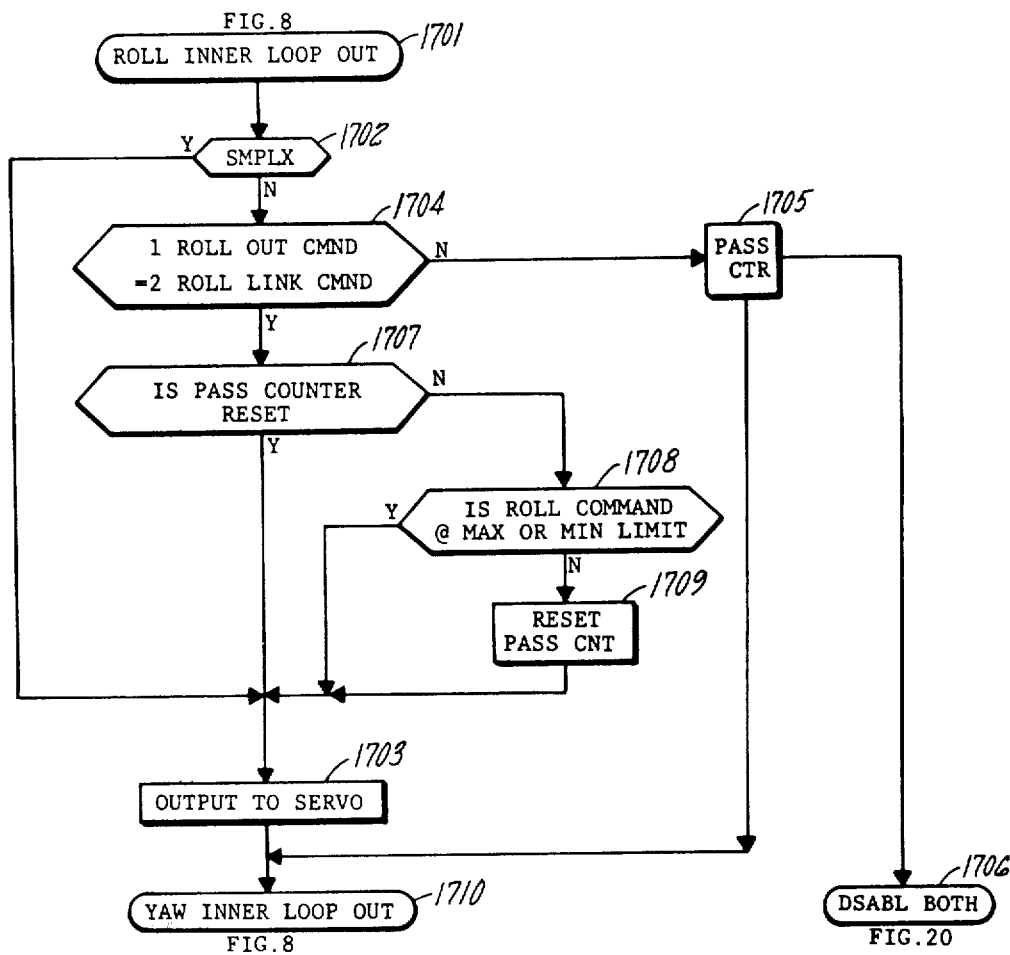
FIG. 17 is a simplified logic flowchart of the roll inner loop output subroutine of the program of FIG. 8.

Once the new calculation has been generated, limited and faded as necessary, test 1627 determines if the feedback test for the roll inner loop valve 68 (FIG. 2) was completed successfully as may have been performed in test 809. If so, then test 1628 determines if computer 1 is the simplex mode, and if not test 1629 determines if the similar feedback test for computer 2 was successful: if so, then there is a new output which is to be utilized in supplying one half of the necessary command to the coil 68 (FIG. 1) and computer 2 will provide one half of a command to coil 70 (FIG. 1) so that computer 1 not only provides a one half command value to coil 68, but it also provides a one half command value to the DMA data link for pickup by computer 2, such that computer 2 can compare it with its output to see if accurate. This comparison is done in the next interrupt, as is described more fully with respect to FIG. 17 hereinafter.

If test 1629 showed that the computer 2 roll inner loop feedback test failed, then computer 1 known it should supply sufficient current for a full command to the coil 68 (FIG. 1) because there will be no current supplied to the coil 70 (FIG. 1). In this case, it is also known that computer 2 should have sensed the failure since it provided the status of failure to computer 1; and therefore, a zero is sent to computer 2 via the DMA data link for comparison with its assumed zero output. This is accomplished in steps 1632 and 1633.

If test 1628 determines that computer 1 is in the simplex mode, it obviously is getting no help from computer 2 and must send a full command to its output via step 1632. Although computer 2 is disabled at this point, it is just as simple to send a zero to the data link in any event.

If test 1627 determines that computer 1 did not have a good roll inner loop coil feedback test, and test 1634 determines that computer 1 is not in a simplex mode, meaning that computer 2 is still calculating, and if test 1635 shows that computer 2 has not shut down the roll inner loop channel because its feedback test was o.k. the last time it was made, then computer 1 will set a zero to its own output but will send the full command which it calculated over to computer 2, via the DMA data link, so that computer 2 may compare its output therewith, in steps 1636 and 1637. This is the converse of steps 1632 and 1633.

But if test 1635 shows that computer 2 has shut down the roll inner loop channel altogether, or if step 1634 shows that computer 2 isn't even operating, then there is no roll inner loop channel (test 1627 determining that computer 1's output coil 68 is improper), so that steps 1638 and 1639 will send zero to the output and zero over the data link for comparison with the calculation of computer 2. Notice that steps 1638 and 1639 could be operative even in the case where the roll inner loop is shut down via steps 1627 and 1635; but continuous comparison of their calculated results can be useful because if they don't compare in FIG. 17, whether or not their outputs are going to be used, this can cause both computers to disable themselves, potentially, this adds a greater margin of safety to the remaining functions being performed by the two computers when in the duplex mode, even though one complete output channel has failed.

As described briefly hereinbefore with respect to FIGS. 7 and 8, the roll inner loop calculation which is performed during the first real time interrupt is compared with that of the second computer and if proper, outputted for actual use in its roll servo valve during the next real time interrupt as shown in FIG. 8. The roll inner loop output subroutine 802 is shown in detail in FIG. 17. Therein, this subroutine is entered through program entry point 1701. Test 1702 determines if computer 1 is operating alone, in the simplex mode. If it is, it is obvious that there is no other calculation to compare with, since computer 2 can't provide one. It therefore jumps down to step 1703 to provide the calculated output to the roll servo valve (via 68b, 80, 81, 82 and 84, FIG. 2). But if computer 1 is not in the simplex mode, then the roll command calculated in computer 1 as described in FIG. 16 is compared with the roll command calculated at the comparable point in computer 2, which has by this time been transferred by the DMA data link to computer 1. If the two calculated commands are identically equal with each other, then the output is transferred to the servo in step 1703 as described hereinbefore. This is the computer 1 output which has previously been determined (step 1630, FIG. 16) in such case to be one half of the total command, which is aided in the servo by another half command from computer 2. in contrast, when in simplex operation, the calculated output will have been left at full command (step 1632, FIG. 16).

In the event that test 1704 determines that the two results do not agree with each other, a pass counter 1705 is incremented and step 1703 is bypassed so that the old command (stored in S/H 85, FIG. 2) is used one more time. In this case, the pass counter is set to a very large number such as 24 to allow one complete BG program. If more than the selected number of failures occur in test 1704, the pass counter will switch the program through program transfer point 1706 to a subroutine for disabling both computers. The reason for disabling both computers at this point is that everything else having checked, a failure to compare calculated results is an indication of trouble at the heart of one of the computers, which affects its ability to calculate. Each CPU is only checkable by its own self testing, which should have disabled the faulty CPU before now. And since this failure to agree has been sensed by computer 1, and it has no way to trust computer 2's word for the fact that computer 2 may be right and computer 1 may be wrong, an important aspect of the present invention comes into play, and computer 1 decides that it will have to take both computers off line, in program transfer point 1706.

If, after the pass counter has been employed, and good comparable results are indicated in test 1704, then the pass counter may be reset; in this case, however, it is not allowed to be reset if the agreement between C1 and C2 is due to their outputs being limited (as in step 1626).

The reason for this is, if test 1704 is being passed due to limiting, but had previously failed, this factor must be kept track of because it is indicative of a likelihood of faulty operation. So step 1707 determines if the pass counter is active, test 1708 determines if the values are on limits, and only if not will step 1709 reset the pass counter 1705. Unless the roll inner loop output subroutine is terminated by disabling both computers through program transfer point 1706, the program will ultimately return to the yaw inner loop output subroutine of FIG. 8 through program transfer point 1710.

As described hereinbefore with respect to FIG. 5, in the programming within each MACRO SYNCH interrupt, a link test 524 is performed, in which each DMA sends the other computer data over the link for comparison with what it should be in the other computer. During the major fault logic of FIG. 15, the status of the link test is interrogated in test 1523. If the link test failed because of the fact that either computer did not agree with the data which it sent or received, then the resolve link subroutine is entered at transfer point 1531. This subroutine, entered on FIG. 18 in program entry point 1801, will resolve, if possible, why the link test failed, by having computer 1 do a link wraparound test on itself and determining whether it passed or failed its own test. At the same time, computer 2 should be doing the same thing; after waiting a while, if computer 1 hasn't decided that it was bad, it will see if computer 2 has decided that it, instead, is bad. But if neither computer finds its own link wraparound test to be bad, then the situation is indeterminate, and computer 1 will resolve it by disabling both computers. On the other hand, if computer 1 says that it is o.k. and computer 2 has by that time disabled itself, then computer 1 will transfer into the simplex mode rather than disabling itself as well. This is an example of the fail-operational characteristic in accordance with one aspect of the invention.

Specifically, whenever the data link is determined to be bad, the force augmentation system is turned off instantaneously and permanently in step 1802, because if the problem isn't resolved, both computers are going to shut down anyway; and if it is resolved in computer 1, computer 1 will be in simplex mode, and force augmentation is not permitted in the simplex mode because the excessive authority capable can be catastrophic and is not permitted unless there are two computers to check each other. In step 1803, the executive is set into the nonservice mode because this program will resolve itself by shutting down one or both computers or transferring into the simplex mode; if in simplex, re-initialization must first take place; if this computer is shut off, all work is done anyway. In step 1803a the data link is set to the wraparound state (55, FIG. 1) and subroutine 1804 performs a link wraparound test between the two DMA memories which are within computer 1. Then in step 1805 the data link is restored to normal, inter-computer configuration. If computer 1 determines that its link wraparound test was no good in test 1806, it will set an appropriate code in step 1807 and disable itself by transferring to the disable self subroutine through program transfer point 1808. This is consistent with each computer determining its own health and not relying on the other computer to determine its health, since if computer 1 says its own wraparound test is no good then computer 1 puts itself off line.

If test 1806 shows that computer 1 made a good wraparound test, it then waits 20 milliseconds in step 1809 to permit adequate time for computer 2 (which is not running synchronously, other than on a machrosynch basis) to perform its own link wrap test and to disable itself, if it is faulty. In test 1810, if computer 2 has not disabled itself, then there is an unresolved failure of a data link test, and an inability of either computer to assume the blame. Since, in accordance with the invention, neither computer is allowed to function unless it is absolutely certain that it can do so, and if the two computers disagree as to whose fault the link test is, then the irresolvable problem is solved by setting a proper code in step 1803 and entering the disable both subroutine through program transfer point 1812. On the other hand, if computer 2 has admitted fault in test 1810 by disabling itself and sending an appropriate notice thereof to computer 1, then computer 1 will set an appropriate code in step 1813 and will enter the simplex mode of operation through program transfer point 1814.

Figure 19:
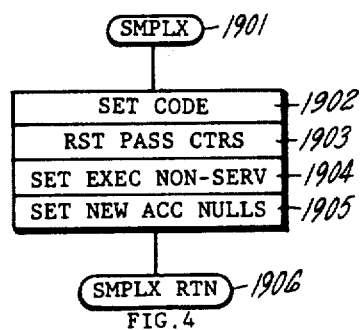
FIG. 19 is a simplified logic flowchart of the simplex subroutine portion of the program for the embodiment of FIG. 1.

In FIG. 19, the simplex subroutine is entered by program entry 1901 and in steps 1902-1905, an appropriate code is set, all the pass counters are reset, the executive is set into the non-service mode (this will be reestablished in the reinitialization of FIG. 4 into the service mode), and new accelerometer nulls are provided. When in the simplex mode, the null is not performed on an average basis combined with the average of two sensor inputs, but only in a straight basis for one sensor input. Therefore the average null to accommodate two sensors has to be substituted for a single null for the particular sensor to be used in the simplex mode. And then the routine is transferred to re-initialize, as described with respect to FIG. 4, through the simplex return program transfer point 1906.

Figure 20:
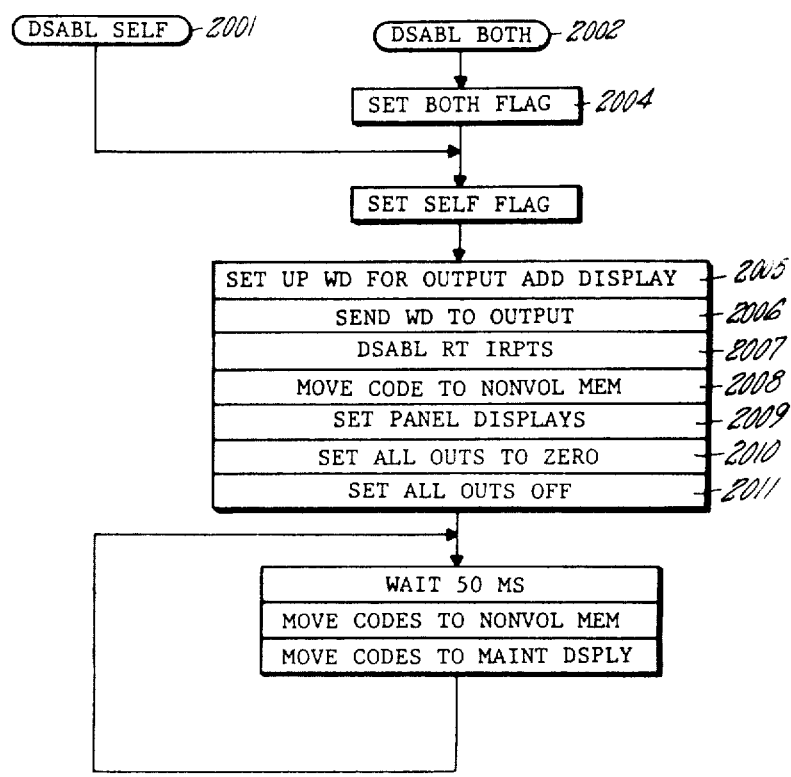
FIG. 20 is a simplified logic flowchart of the disable subroutine portions of the program for the embodiment of FIG. 1.

Referring now to FIG. 20, the disabling of computer 1 can occur either by entering through the disable self program entry 2001 or by means of the disable both program entry point 2002. The only difference between these is that both flags are set in steps 2003, 2004, if entered at 2002. After identifying whether the disablement is just for self or for both, a number of additional program steps place the computer into a condition to lock up in a disable mode. A word is set up in step 2005 to be passed to the output of computer 1 as well as to whatever display is involved with the control system in which the invention is being practiced, such as pilot displays in the present exemplary embodiment. This word, which includes the flags set by step 2003 and/or 2004, is then sent in step 2006 to the output circuitry described with respect to FIG. 2, to control the shutting down of the outputs commensurate with entering into the disabled mode. The real time interrupts, including macro synch and the other four real time interrupts are then disabled in step 2007, and then the critical codes that identify those characteristics of the current status of the system which will be of interest to operators and to maintenance, and which must maintain control of the system in the event that there is power down during disablement, are sent to the nonvolatile memory so that they will be preserved even if power is lost. This is accomplished in step 2008. Then in step 2009 the displays are set with the words provided in step 2005, hereinbefore. All sample/hold circuits at the output are set with zeros in step 2010, and all outputs are turned off (physically opened) by discrete removal of relay connections between the output drivers and the actual valve control coils, or other output actuator devices, in step 2011, as is described more fully with respect to FIG. 2 hereinbefore. And then computer 1 will hang up in a program loop which includes waiting 50 milliseconds (2012), moving any codes that should be placed in nonvolatile memory (2013), and moving codes to the maintenance display. In other words, the only thing that the computer 1 can thereafter do is to respond to human intervention, and a power on reset.

Referring now to FIG. 21, the calculation of fade-in, fade-out coefficients alluded to briefly with respect to FIGS. 13 and 16 is performed in a subroutine entered at routine entry point 2101. If the stability augmentation system is on as indicated in step 2102, the servos are on as indicated in step 2103, and neither roll rate gyro is no good as indicated in step 2104, or even if roll rate gyro 1 is no good as indicated in step 2205 for computer 1 is not in the simplex mode as indicated in step 2206, then a fade-in coefficient calculation (to be multiplied against a calculated value) is made by starting with zero and adding a delta to it in a subroutine 2207. This calculation may go on forever, but whenever the fade-in coefficient reaches 1, as indicated in test 2208, then step 2209 forces the fade-in coefficient to be equal to 1.

Negative results on any of the tests 2102–2106 indicate that the roll inner loop which has been calculated (or such other parameter as may be faded by means of this or a similar subroutine) must be reduced from some value slowly down to zero, so that a fade-out calculation is involved by subtracting a delta from 1 on each iteration in subroutine 2810 until the coefficient reaches zero as determined in step 2811; thereafter the coefficient is maintained as zero by step 2812.

If the fade-in/out constant is zero, as indicated in test 2813, the roll inner loop is turned off at step 2814. If the step 2814 is invoked to shut off the roll inner loop, this may be accomplished by providing a suitable discrete on the line 61(a)-1 in FIG. 2 to disengage the relay contacts 96, as described hereinbefore. This provides a specific example of the partial shutdown of a channel to operate in a degraded mode, independently of whether the computer is operating in simplex or duplex mode. It should be pointed out that many of the tests 2102–2105 may be performed in the simplex/duplex operation status subroutine 1104, and a combined result used in the fade-in/out calculation of FIG. 21.

Completion of the fade-in/out calculation of FIG. 21, and similar other calculations for other functions requiring fade-in or fade-out, will cause the program to return through program transfer point 1306 (FIG. 13).

The foregoing description of an overall dual computer control system controlling aircraft servos has included a general programming and direct memory access outline, and specific subroutines for performing functions particularly related to the invention. These are exemplary merely, and it should be understood that, although the invention has been implemented utilizing the Hamilton Standard AFCS 53E C-MOS processors with suitable apparatus as disclosed herein so as to form a dual computer control system, the processors may be Teledyne TDY-43, or similar other processors. The particular program provided for the computers is, of course, dependent upon the architecture of the computers chosen for use, but in the light of the teachings herein, the invention may be implemented with standard programming techniques. Although the invention is described in terms of a dual computer system, it should be understood that the precepts of the invention are fully applicable to systems having a higher order of redundancy. For instance, three or more systems may be interconnected utilizing the teachings of the invention. In such a case, the simplex status would occur only in the event of there being no other system in an operational mode; resolution of failed input units could be achieved without use of a pseudo input (such as that described with respect to FIG. 16 herein), there being adequate input units for checking among the systems themselves; and results may be compared as between any two or more systems, depending upon the constraints of program storage capacity and CPU processing time, as well as the number of systems in use and not disabled. However, it is deemed that the application of the invention to such higher ordered systems is within the skill of the art in the light of the teachings herein. Similarly, although the invention has been shown and described with respect to an exemplary embodiment thereof, it should be understood by those skilled in the art that the foregoing and various other changes, omissions and additions in the form and detail thereof may be made therein and thereto, without departing from the spirit and the scope of the invention.

Having thus described a typical embodiment of our invention, that which we claim as new and desire to secure by Letters Patent is:

1. A multiple computer process control system, in which each computer system comprises:
   a plurality of inputs for providing signals for controlling said process;
   a plurality of outputs corresponding to different functions to be controlled in said process;
   feedback paths from said outputs to said inputs to provide feedback signals to said computer system indicative of the operation of said outputs;
   a data link for providing data communication with a second one of said computer systems; and
   program controlled means for performing a plurality of self tests indicative of the correct operation of said computer system and providing a self test failure signal in the event of failure of one of said self tests, for receiving signals from said inputs and providing calculated signals in response thereto related to said outputs, for providing command signals related to said calculated signals, for applying said command signals to corresponding ones of said outputs, for comparing the respective feedback signals provided by said feedback paths with corresponding ones of said command signals and providing a feedback failure signal corresponding to a related one of said outputs in the event of discrepancy between said command signals and said feedback signals corresponding to said related one of said outputs, for disabling any one of said outputs in response to a corresponding feedback failure signal, for disabling all of said outputs in response to a self test failure signal, for communicating said feedback failure signals to said second computer system, and for providing with respect to any one of said outputs which is disabled in said computer system, a zero-valued command signal to said output and a command signal equal to said calculated signal to said second computer system over said data link for comparison, in said second computer system, with a command signal equal to said calculated signal provided by said second computer system with respect to an output thereof corresponding to the output of said computer system which has been disabled.

2. a multi-computer process control system according to claim 1 in which said program controlled means comprises means for receiving said feedback failure signals from said second computer system, and for providing, with respect to any one of said outputs which is not disabled in said computer system and which relates to a corresponding output of said second computer system for which one of said feedback failure signals has not been received by said computer system, a half-command signal equal to one half the value of said calculated signal to said output and to said second computer system over said data link for comparison, in said second computer system, with a half-command signal equal to one half the value of a calculated signal provided by said second computer system with respect to said corresponding output.

3. A multi-computer process control system according to claim 1 in which each computer further comprises a data link for providing data communication with a second one of said computer systems, and wherein said program controlled means comprises means for communicating said feedback failure signals to said second computer system and receiving said feedback failure signals from said second computer system, and for providing, with respect to any one of said outputs which is not disabled in said computer system and which relates to an output of said second computer system for which one of said feedback failure signals has been received by said computer system, a command signal equal to said calculated signal to said output and a zero-valued command signal to said second computer system over said data link for comparison, in said second computer system, with a zero-valued command signal provided by said second computer system with respect to said output for which a feedback failure signal has been provided to said computer system.

* * * * *